(12) United States Patent
Takagi et al.

(10) Patent No.: US 8,775,370 B2
(45) Date of Patent: Jul. 8, 2014

(54) DATA STORAGE APPARATUS AND METHOD

(75) Inventors: Yoshihiro Takagi, Kawasaki (JP);
Masayuki Miura, Kawakami (JP);
Katsumi Goto, Fukuoka (JP); Takuya Koga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 12/457,990

(22) Filed: Jun. 26, 2009

(65) Prior Publication Data

US 2009/0292741 A1  Nov. 26, 2009

Related U.S. Application Data

(63) Continuation of application No. PCT/JP2006/325866, filed on Dec. 26, 2006.

(51) Int. Cl.
*G06F 17/30* (2006.01)

(52) U.S. Cl.
USPC .......................................... 707/609; 707/610

(58) Field of Classification Search
CPC combination set(s) only.
See application file for complete search history.

(56) References Cited

U.S. PATENT DOCUMENTS

| | | | | |
|---|---|---|---|---|
| 6,606,744 | B1 * | 8/2003 | Mikurak ........................ | 717/174 |
| 7,801,798 | B1 * | 9/2010 | Huemer et al. ................. | 705/37 |
| 2004/0015497 | A1 * | 1/2004 | Swarna et al. .................... | 707/6 |
| 2004/0111306 | A1 | 6/2004 | Yokota et al. | |
| 2004/0111351 | A1 | 6/2004 | Ikeda et al. | |
| 2004/0181422 | A1 | 9/2004 | Brand | |
| 2005/0055257 | A1 * | 3/2005 | Senturk et al. .................... | 705/8 |
| 2005/0288989 | A1 * | 12/2005 | Kim et al. ........................ | 705/10 |
| 2006/0106637 | A1 * | 5/2006 | Johnson et al. ................... | 705/1 |
| 2006/0265310 | A1 * | 11/2006 | Cohen et al. .................... | 705/37 |

FOREIGN PATENT DOCUMENTS

| | | |
|---|---|---|
| DE | 102 21 637 | 12/2003 |
| GB | 2 262 369 | 6/1993 |
| JP | 2004-118788 | 4/2004 |
| JP | 2004-348420 | 12/2004 |
| JP | 2005-25589 | 1/2005 |
| JP | 2005-149414 | 6/2005 |
| JP | 2005-174018 | 6/2005 |
| JP | 2005-216202 | 8/2005 |
| JP | 2005-234734 | 9/2005 |

OTHER PUBLICATIONS

Extended European Search Report for corresponding European Application No. 06 84 3250, mailed on Feb. 2, 2011.

(Continued)

*Primary Examiner* — Shyue Jiunn Hwa
(74) *Attorney, Agent, or Firm* — Staas & Halsey LLP

(57) ABSTRACT

A detailed data storage apparatus creates, when a detailed data database that stores therein detailed data relatint to each stage of a process executed through multiple stages receives detailed data relating to a predetermined stage, forecast detailed data indicating contents predicted for a stage next to a predetermined stage and subsequent stages from the detailed data, and stores the forecast detailed data in the detailed data database. The apparatus includes an order holding unit that orders and holds the multiple stages; a determining unit that determines whether there is a stage immediately previous to the predetermined stage; and an offset detailed-data creating unit that creates offset detailed data including a content for offsetting the forecast detailed data created at the immediately previous stage when the determining unit determines that there is the immediately previous stage, so as to store the offset detailed data in the detailed data database.

12 Claims, 19 Drawing Sheets

(56) References Cited

OTHER PUBLICATIONS

Akio Hirai, "System Architecture Yoso Gijutsu o Rikai Shiyo", WEB+DB Press, Aug. 1, 2004, vol. 21, pp. 139-144.
Hitoshi Oketani, "DWH de Gyomu wa Do Kawarunoka?" IT Select, Nov. 1, 2003, vol. 3, No. 12, pp. 20-27.
International Search Report (Form PCT/ISA/210) for International Application No. PCT/JP2006/325866, mailed Jan. 30, 2007.
European Oral Proceeding issued Dec. 11, 2012, in corresponding European Patent Application No. 06843250.9.
"Data Warehouse", Wikipedia, Dec. 2006, pp. 1-8.

* cited by examiner

| INPUT SYSTEM | DECLARED IDENTIFICATION CATEGORY | TRANSACTION DATE | SLIP No. | AMOUNT | DECLARED DATE |
|---|---|---|---|---|---|
| NEGOTIATION | NEGOTIATION (SETTLED) | 20 MAY | S001 | ¥1,200,000 | 20 MAY (SETTLED) |
| NEGOTIATION | ORDER ACCEPTANCE (FORECAST) | 20 MAY | S001 | ¥1,200,000 | 20 JUNE (SCHEDULED DATE FOR ORDER ACCEPTANCE) |
| NEGOTIATION | SALES (FORECAST) | 20 MAY | S001 | ¥1,200,000 | 30 JUNE (SCHEDULED DATE FOR SALES) |
| NEGOTIATION | COST (FORECAST) | 20 MAY | S001 | ¥960,000 | 30 JUNE (SCHEDULED DATE FOR PAYMENT AT COST) |

⋮

(B)

| INPUT SYSTEM | DECLARED IDENTIFICATION CATEGORY | TRANSACTION DATE | SLIP No. | AMOUNT | DECLARED DATE |
|---|---|---|---|---|---|
| NEGOTIATION | NEGOTIATION (SETTLED) | 20 MAY | S001 | ¥1,200,000 | 20 MAY (SETTLED) |
| NEGOTIATION | ORDER ACCEPTANCE (FORECAST) | 20 MAY | S001 | ¥1,200,000 | 20 JUNE (SCHEDULED DATE FOR ORDER ACCEPTANCE) |
| NEGOTIATION | SALES (FORECAST) | 20 MAY | S001 | ¥1,200,000 | 30 JUNE (SCHEDULED DATE FOR SALES) |
| NEGOTIATION | COST (FORECAST) | 20 MAY | S001 | ¥960,000 | 30 JUNE (SCHEDULED DATE FOR PAYMENT AT COST) |
| ORDER ACCEPTANCE | ORDER ACCEPTANCE (SETTLED) | 20 JUNE | J001 | ¥1,000,000 | 20 JUNE (SETTLED) |
| ORDER ACCEPTANCE | SALES (FORECAST) | 20 JUNE | J001 | ¥1,000,000 | 30 JUNE (SCHEDULED DATE FOR SALES) |
| ORDER ACCEPTANCE | COST (FORECAST) | 20 JUNE | J001 | ¥800,000 | 30 JUNE (SCHEDULED DATE FOR PAYMENT AT COST) |
| ORDER ACCEPTANCE | ORDER ACCEPTANCE (OFFSET) | 20 JUNE | J001 | -¥1,200,000 | 20 JUNE |
| ORDER ACCEPTANCE | SALES (OFFSET) | 20 JUNE | J001 | -¥1,200,000 | 30 JUNE |
| ORDER ACCEPTANCE | COST (OFFSET) | 20 JUNE | J001 | -¥960,000 | 30 JUNE |

| ORDER | STAGE |
|---|---|
| 1 | NEGOTIATION |
| 2 | ORDER ACCEPTANCE |
| 3 | SALES |
| 4 | PAYMENT AT COST |

(B)

| ORDER | STAGE |
|---|---|
| 1 | ESTIMATE |
| 2 | ORDER PLACEMENT |
| 3 | ACCEPTANCE |

FIG.9

BUDGET AREA

INITIAL VERSION

| YEAR/MONTH | BUDGET/ PERFORMANCE CATEGORY | ACCOUNT TITLE | SECTION | AMOUNT |
|---|---|---|---|---|
| 06/04 | BUDGET | SALES | SALES 1 | ¥100 |
| 06/04 | BUDGET | SALES | SALES 2 | ¥200 |
| 06/05 | BUDGET | SALES | SALES 1 | ¥200 |
| 06/05 | BUDGET | SALES | SALES 2 | ¥200 |

REVIEWED VERSION 1

| YEAR/MONTH | BUDGET/ PERFORMANCE CATEGORY | ACCOUNT TITLE | SECTION | AMOUNT |
|---|---|---|---|---|
| 06/04 | BUDGET | SALES | SALES 1 | ¥110 |
| 06/04 | BUDGET | SALES | SALES 2 | ¥220 |
| 06/05 | BUDGET | SALES | SALES 1 | ¥200 |
| 06/05 | BUDGET | SALES | SALES 2 | ¥200 |

FIG.10

AREA OF ORDER ACCEPTANCE/SALES/COST

VERSION 0 (FIXED)

| YEAR/MONTH | BUDGET/ PERFORMANCE CATEGORY | ACCOUNT TITLE | SECTION | AMOUNT |
|---|---|---|---|---|
| 06/04 | PERFORMANCE | SALES | SALES 1 | ¥100 |
| 06/04 | PERFORMANCE | SALES | SALES 2 | ¥250 |
| 06/05 | PERFORMANCE | SALES | SALES 1 | ¥200 |
| 06/05 | PERFORMANCE | SALES | SALES 2 | ¥150 |

FIG.11

BUDGET AREA

INITIAL VERSION

| YEAR/MONTH | BUDGET/ PERFORMANCE CATEGORY | ACCOUNT TITLE | AMOUNT |
|---|---|---|---|
| 06/04 | BUDGET | SALES | ¥300 |
| 06/05 | BUDGET | SALES | ¥400 |

REVIEWED VERSION 1

| YEAR/MONTH | BUDGET/ PERFORMANCE CATEGORY | ACCOUNT TITLE | AMOUNT |
|---|---|---|---|
| 06/04 | BUDGET | SALES | ¥330 |
| 06/05 | BUDGET | SALES | ¥400 |

FIG.12

AREA OF ORDER ACCEPTANCE/SALES/COST

VERSION 0 (FIXED)

| YEAR/MONTH | BUDGET/ PERFORMANCE CATEGORY | ACCOUNT TITLE | AMOUNT |
|---|---|---|---|
| 06/04 | PERFORMANCE | SALES | ¥350 |
| 06/05 | PERFORMANCE | SALES | ¥350 |

FIG.13

BUDGET AREA

BUDGET/PERFORMANCE COMPARISON INITIAL VERSION

| YEAR/MONTH | BUDGET/ PERFORMANCE CATEGORY | ACCOUNT TITLE | AMOUNT |
|---|---|---|---|
| 06/04 | BUDGET | SALES | ¥300 |
| 06/05 | BUDGET | SALES | ¥400 |
| 06/04 | PERFORMANCE | SALES | ¥350 |
| 06/05 | PERFORMANCE | SALES | ¥350 |

BUDGET/PERFORMANCE COMPARISON CURRENT VERSION

| YEAR/MONTH | BUDGET/ PERFORMANCE CATEGORY | ACCOUNT TITLE | AMOUNT |
|---|---|---|---|
| 06/04 | BUDGET | SALES | ¥300 |
| 06/05 | BUDGET | SALES | ¥400 |
| 06/04 | PERFORMANCE | SALES | ¥350 |
| 06/05 | PERFORMANCE | SALES | ¥350 |

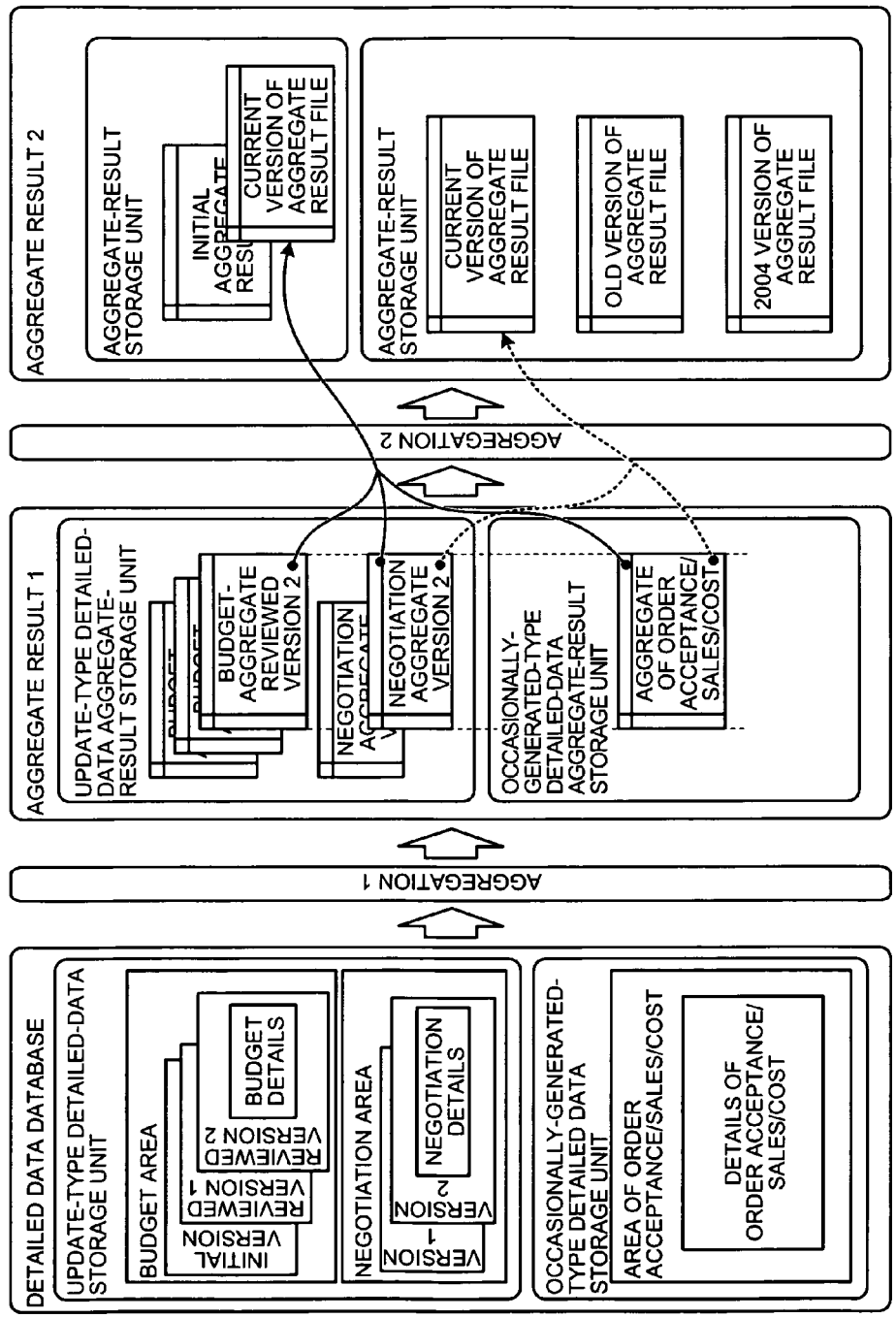

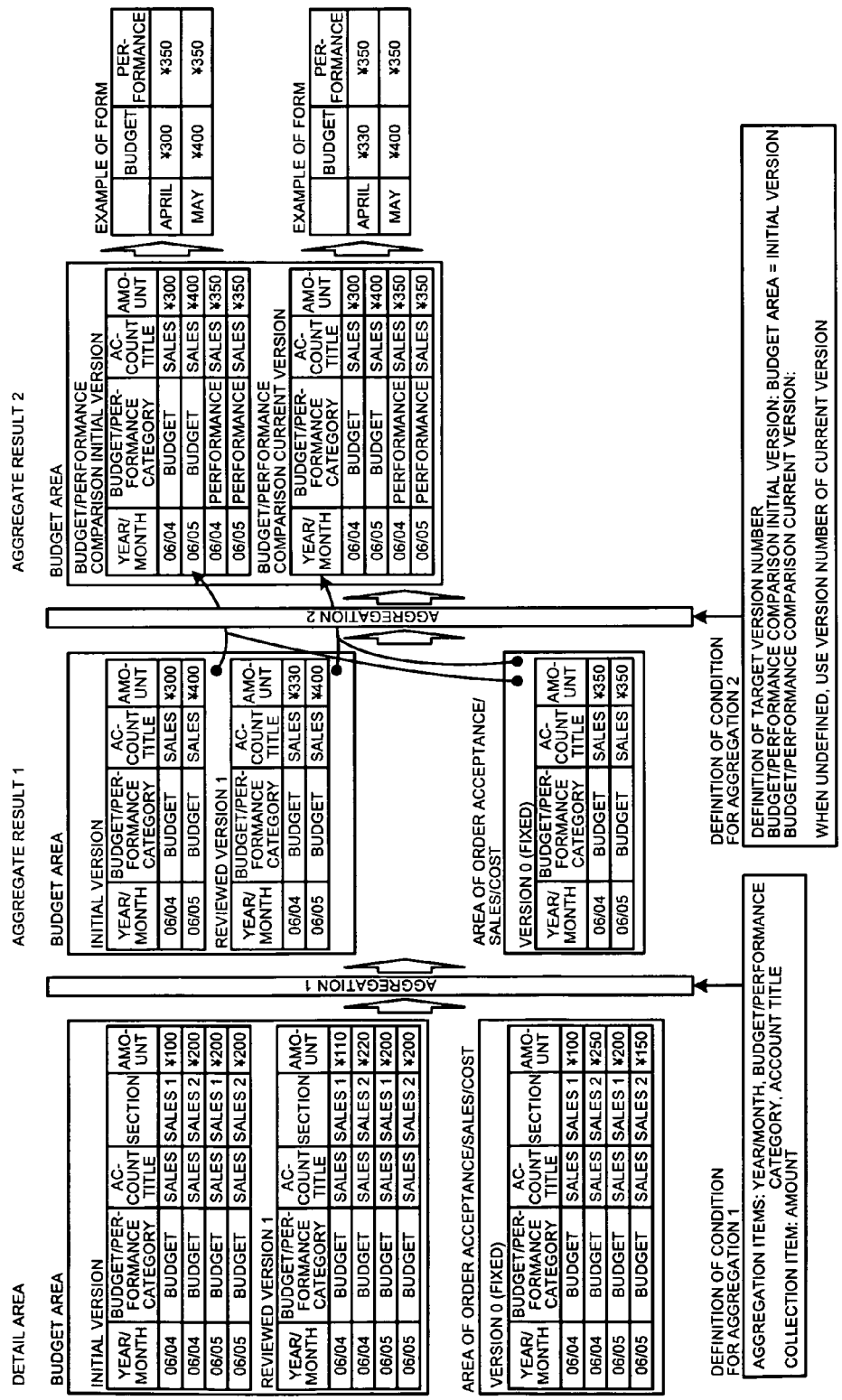

DATA STORAGE APPARATUS AND METHOD

CROSS-REFERENCE TO RELATED APPLICATION(S)

[Continuation Application Ver]
This application is a continuation of PCT international application Ser. No. PCT/JP2006/325866 filed on Dec. 26, 2006 which designates the United States, incorporated herein by reference, the entire contents of which are incorporated herein by reference.

FIELD

The embodiments discussed herein are directed to a detailed data storage apparatus and method.

BACKGROUND

Conventionally, use of a data warehouse (DWH) has attracted attention as means for adjusting "detailed data" to business analysis of various purposes. Here, "detailed data" is data which is input to a core system, and includes information on minor details, such as a detailed statement or slip. Generally, the analysis of detailed data by using a data warehouse is realized by: a source database which stores therein detailed data of an individual system such as a core system; a data warehouse which aggregates and stores therein the detailed data stored in a plurality of source databases; a data mart which stores therein an aggregate result obtained by aggregating the detailed data stored in the data warehouse for a desired analysis purpose; and a front-end application for analyzing the aggregate result stored in the data mart.

Here, the aggregation of the detailed data means that pieces of detailed data in different systems are aggregated. Therefore, consistency between different systems is generally ensured by using a tool referred to as an Extract Transform Load (ETL) tool. Specifically explaining, for example, the ETL tool ensures the consistency between different systems by adjusting inconsistency between descriptions of "22-345, 1-chome" and description of "1-22-345". For example, according to a method disclosed in Japanese Patent Application Laid-open No. 2005-174018, when a developer designs a plurality of input and output programs (programs including input data, process, and output data), a system management apparatus registers a relation between the input data and the output data in a database for each program, displays a registration result on a screen so that the developer can confirm whether there is no overlapping processes, thereby ensuring the consistency between different systems.

In the conventional technique, however, there is a problem that inconsistency of detailed data between stages in a process executed through multiple stages may not be avoided as explained below.

That is, the ETL tool ensures the consistency between different systems when a code system, attribute, and description of the detailed data are different for each system, however, it cannot ensure the consistency of the detailed data between stages in the process executed through multiple stages. The method disclosed in Patent Document 1 can only display a relation between input data and output data on a screen, and correction thereafter is performed manually by a developer. Accordingly, the above problem is not solved.

SUMMARY

According to an aspect of the invention, a computer readable storage medium contains instructions for creating, when a detailed data database that stores therein detailed data relating to each stage of a process executed through multiple stages receives detailed data relating the predetermined stage, forecast detailed data indicating contents predicted for a stage next to a predetermined stage and subsequent stages from the detailed data, and storing the forecast detailed data in the detailed data database. The instructions, when executed by a computer, causes the computer to perform an order holding procedure of ordering and holding the multiple stages; a determining procedure of determining whether there is a stage immediately previous to the predetermined stage based on an order held at the order holding procedure upon reception of the detailed data relating to the predetermined stage; and an offset detailed-data creating procedure of creating offset detailed data including a content for offsetting the forecast detailed data created at the immediately previous stage when it is determined that there is the immediately previous stage at the determining procedure, so as to store the offset detailed data in the detailed data database.

According to another aspect of an embodiment, a computer readable storage medium contains instructions for storing detailed data, which have been accepted to be input, in a detailed data database and performing aggregation of the detailed data. The instructions, when executed by a computer, causes the computer to perform an update-type detailed-data storing procedure of storing, every time an input of update type detailed data in a type of data to be updated at a predetermined update time is received, the update type detailed data sorted by update time; an occasionally-generated-type detailed-data storing procedure of adding and storing, every time an input of occasionally generated type detailed data which is a type of data to be occasionally generated is received, the occasionally generated type detailed data; and an aggregating procedure of selecting a piece of the update type detailed data relating to a predetermined time stored at the update-type detailed-data storing procedure and performing aggregation with respect to the predetermined time using the selected update type detailed data and the occasionally generated type detailed data stored at the occasionally-generated-type detailed-data storing procedure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 3 is an explanatory diagram of a detailed data database;

FIG. 4 is an explanatory diagram of an order holding unit;

FIG. 9 is an explanatory diagram of an update-type detailed-data storage unit;

FIG. 10 is an explanatory diagram of an occasionally-generated-type detailed-data storage unit;

FIG. 11 is an explanatory diagram of an update-type detailed-data aggregate-result storage unit;

FIG. 12 is an explanatory diagram of an occasionally-generated-type detailed-data aggregate-result storage unit;

FIG. 13 is an explanatory diagram of an aggregate-result storage unit;

FIG. 14 is an explanatory diagram of an aggregating unit;

FIG. 15 is an explanatory diagram of the aggregating unit;

DESCRIPTION OF EMBODIMENT(S)

Figure 1:
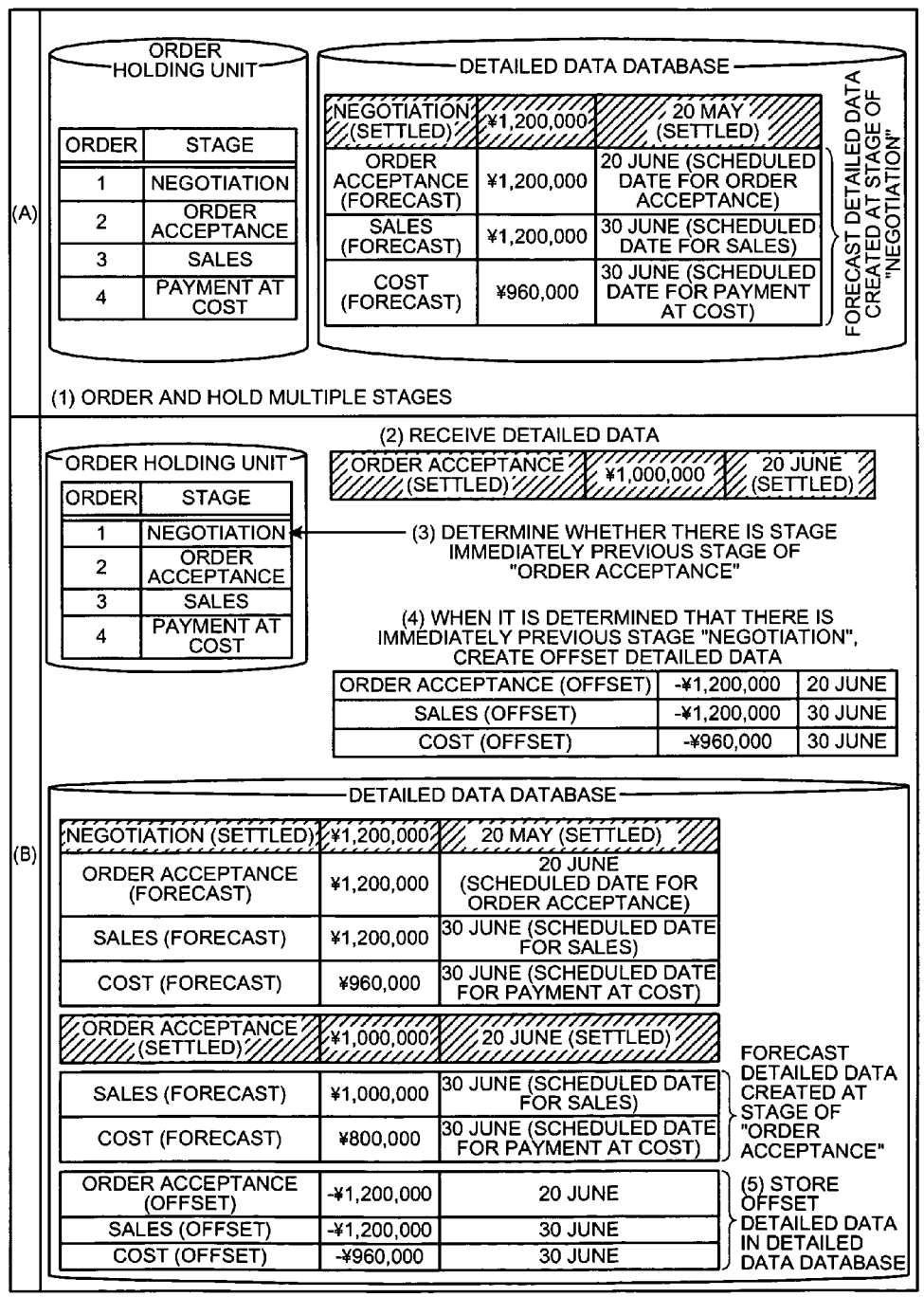
FIG. 1 is an explanatory diagram of an outline and characteristics of a detailed data storage apparatus according to a first embodiment.

Preferred embodiments of a detailed data storage apparatus, a detailed data storage program, and a detailed data storage method according to the present invention will be explained below in detail with reference to the accompanying drawings. Main terms used in embodiments, an outline and features of a detailed data storage apparatus according to a first embodiment, a configuration and process procedures of the detailed data storage apparatus according to the first embodiment, and effects of the first embodiment are explained in this order, and then other embodiments will be explained.

[a] First Embodiment

[Explanations of Terms]

Main terms used in the embodiments below are explained first. Specifically explaining by way of examples, "process executed through multiple stages" stands for process executed through four stages of "negotiation", "order acceptance", "sales", and "payment at cost", or process executed through three stages of "estimate", "order placement", and "acceptance". In such processes, because pieces of data handled in different stages are associated with each other, for example, if a "negotiation" of "¥1,200,000" has been reached at the stage of "negotiation", "forecast of order acceptance" of "¥1,200,000" at the stage of "order acceptance", "forecast of sales" of "¥1,200,000" at the stage of "sales", and "forecast of payment at cost" of "¥960,000" at the stage of "payment at cost" can be made. That is, in the "process executed through multiple stages", forecast data indicating the contents predicted for a stage next to a predetermined stage and subsequent stages can be created.

In the following embodiments, data of detailed contents such as a detailed statement or slip handled in the "process executed through multiple stages" is referred to as "detailed data". That is, the "detailed data" includes items of, for example, "declared identification category", "transaction date", "slip No.", "amount", and "declared date". The detailed data includes, for example, "negotiation (settled)" as a value corresponding to the item "declared identification category", "20 May" as a value corresponding to the item "transaction date", "S001" as a value corresponding to the item "slip No.", "¥1,200,000" as a value corresponding to the item "amount", and "20 May (settled)" as a value corresponding to the item "declared date". The "detailed data storage apparatus" used in the following embodiments creates "forecast detailed data" indicating contents predicted for a stage next to the predetermined stage and subsequent stages from the "detailed data" at the predetermined stage and stores the forecast detailed data in a "detailed data database".

In the "process executed through multiple stages", "detailed data" having a content overlapping on the created "forecast detailed data" may be stored. That is, if the "negotiation" of "¥1,200,000" has been reached at the stage of "negotiation", the detailed data storage apparatus creates "forecast of order acceptance" of "¥1,200,000" predicted for the stage of "order acceptance" from the "detailed data" of "¥1,200,000" at the stage of "negotiation", and stores the forecast data in the "detailed data database". However, if "order acceptance" of "¥1,000,000" is settled thereafter at the stage of "order acceptance", and the settled "¥1,000,000" is stored in the "detailed data database" as the "detailed data" with respect to "order acceptance", "forecast of order acceptance" of "¥1,200,000" and "detailed data" of "¥1,000,000" are stored redundantly with respect to one process. If such storage is performed, inconsistency occurs in the detailed data between stages in the "process executed through multiple stages". Therefore, the "detailed data storage apparatus" needs to have a mechanism for ensuring the consistency of detailed data between stages.

[Outline and Feature of Detailed Data Storage Apparatus According to First Embodiment]

The outline and features of the detailed data storage apparatus according to the first embodiment are explained next with reference to FIG. 1. FIG. 1 is an explanatory diagram of the outline and features of the detailed data storage apparatus according to the first embodiment.

As the outline, when the detailed data database for storing detailed data at each stage of a process executed through multiple stages receives detailed data at a predetermined stage, the detailed data storage apparatus according to the first embodiment creates forecast detailed data indicating contents predicted for a stage next to the predetermined stage and subsequent stages from the detailed data, and stores the forecast detailed data in the detailed data database. As a main feature, consistency of detailed data between stages in the processing executed through multiple stages is ensured.

The main feature is briefly explained. The detailed data storage apparatus according to the first embodiment includes the detailed data database for storing the detailed data at each stage of a process executed through multiple stages (see (A) in FIG. 1). For example, in the example of (A) in FIG. 1, the detailed data database stores detailed data ("¥1,200,000") at the stage of "negotiation", and forecast detailed data ("¥1,200,000", "¥1,200,000", and ¥960,000") respectively indicating the content predicted from the detailed data for a stage next to the stage of "negotiation" and the later stages ("order acceptance", "sales", and "payment at cost").

As depicted in (A) in FIG. 1, the detailed data storage apparatus according to the first embodiment also predicts "scheduled date for order acceptance", "scheduled date for sales", and "scheduled date for payment at cost" as the date on which detailed data will may be created. That is, for example, when each stage of the process executed through multiple stages is realized in different systems, the detailed data storage apparatus also predicts, for ensuring the consistency of the detailed data between stages, the date on which detailed data will may be created, to match the time frame.

The detailed data storage apparatus according to the first embodiment also includes an order holding unit that orders and holds multiple stages (see (1) in (A) in FIG. 1). For example, in the example of (A) in FIG. 1, the order holding unit orders and holds multiple stages of "negotiation", "order acceptance", "sales", and "payment at cost".

With such a configuration, the detailed data storage apparatus according to the first embodiment receives detailed data at a predetermined stage (see (2) in (B) in FIG. 1). For example, the detailed data storage apparatus receives the detailed data at the stage of "order acceptance".

The detailed data storage apparatus then determines whether there is a stage immediately previous to the predetermined stage based on the order held by the order holding unit (see (3) in (B) in FIG. 1). For example, the detailed data storage apparatus determines whether there is a stage immediately previous to the stage of "order acceptance".

When having determined that there is the immediately previous stage, the detailed data storage apparatus creates offset detailed data having a content for offsetting the forecast detailed data created at the immediately previous stage (see (4) in (B) in FIG. 1). For example, the detailed data storage apparatus creates offset detailed data ("−¥1,200,000", "−¥1,200,000", and −¥960,000") of the content for offsetting the forecast detailed data created at the stage of "negotiation", because it is determined that there is the stage of "negotiation", which is the stage immediately previous stage of "order acceptance".

Thereafter, the detailed data storage apparatus stores the created offset detailed data in the detailed data database (see (5) in (B) in FIG. 1). For example, the detailed data storage apparatus stores the created offset detailed data ("−¥1,200,000", "−¥1,200,000", and −¥960,000") in the detailed data database.

At this time, as depicted in FIG. 1(B), the detailed data storage apparatus stores forecast detailed data (¥1,000,000" and "¥800,000") respectively indicating a content predicted from the detailed data for ("sales" and "payment at cost") at the stage next to the stage of "order acceptance" and subsequent stages. Further, as depicted in (B) in FIG. 1, the detailed data storage apparatus predicts the "scheduled date for sales" and "scheduled date for order acceptance" as the date on which detailed data will may be created.

In this manner, the detailed data storage apparatus according to the first embodiment can ensure the consistency of detailed data between stages in the process executed through multiple stages.

[Configuration of Detailed Data Storage Apparatus According to First Embodiment]

Figure 2:
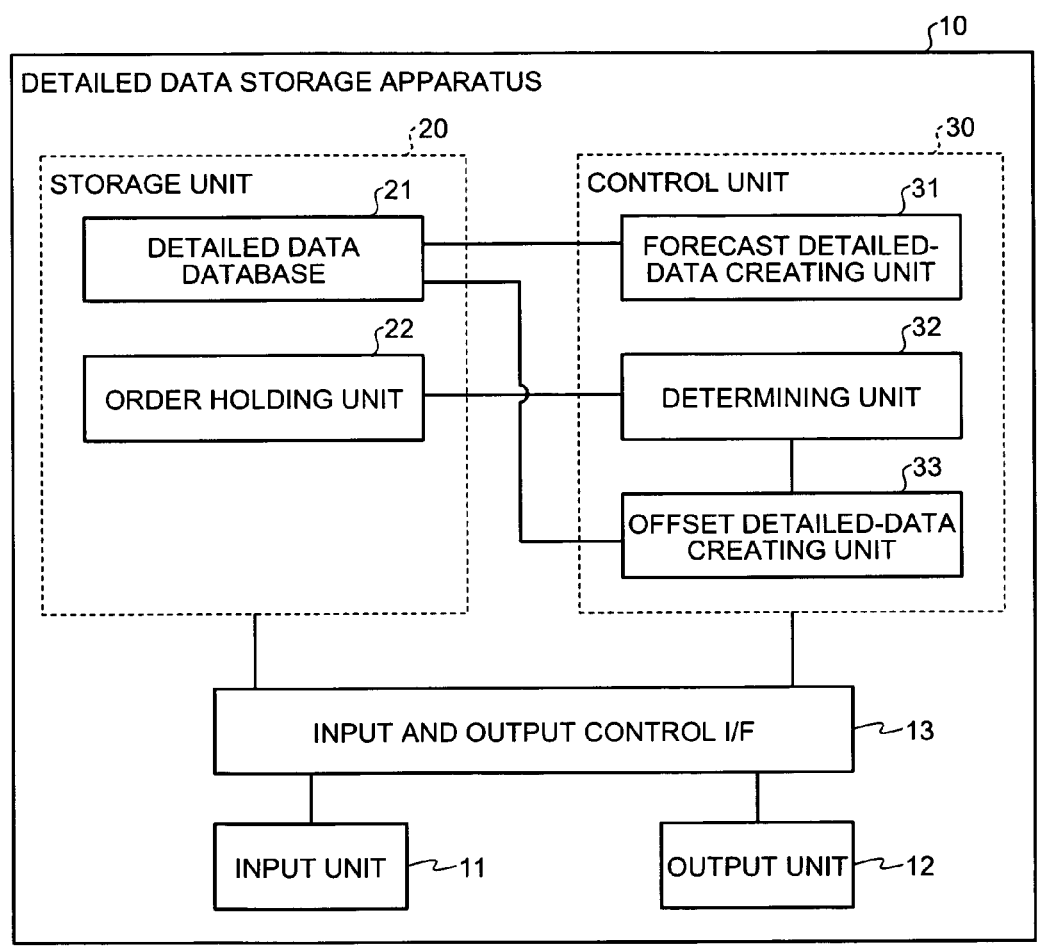
FIG. 2 is a block diagram of a configuration of the detailed data storage apparatus according to the first embodiment.
Figure 5:
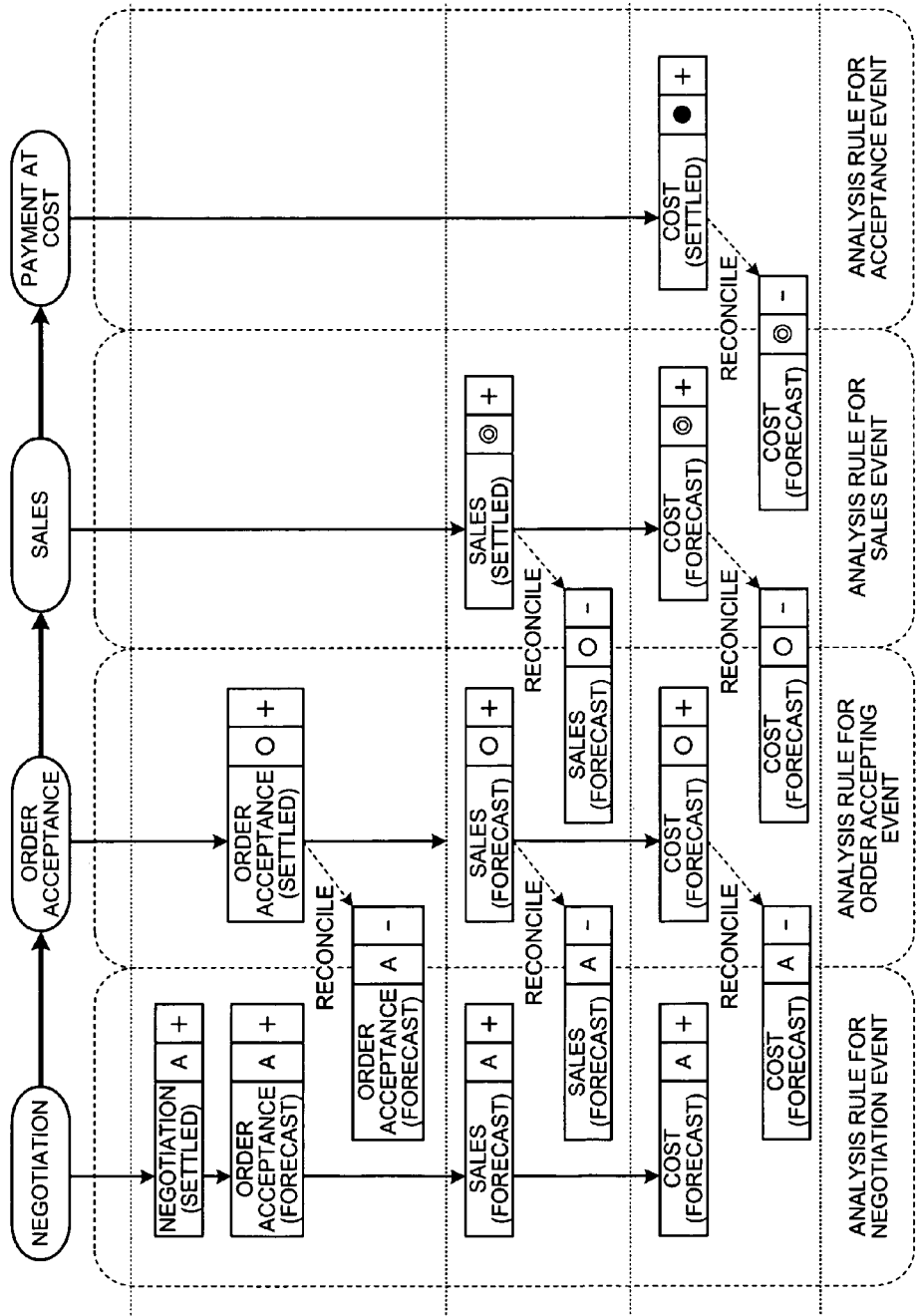
FIG. 5 is an explanatory diagram of an offset detailed-data creating unit.

The detailed data storage apparatus according to the first embodiment is explained next with reference to FIGS. 2 to 5. FIG. 2 is a block diagram of a configuration of the detailed data storage apparatus according to the first embodiment, FIG. 3 is an explanatory diagram of the detailed data database, FIG. 4 is an explanatory diagram of the order holding unit, and FIG. 5 is an explanatory diagram of an offset detailed-data creating unit.

As depicted in FIG. 2, a detailed data storage apparatus 10 according to the first embodiment includes an input unit 11, an output unit 12, an input and output control I/F 13, a storage unit 20, and a control unit 30.

The input unit 11 receives data used for various types of processing performed by the control unit 30, an operation instruction for performing the various types of processing, and the like through a keyboard, a mouse, a storage medium, or communication. Specifically, the input unit 11 receives the detailed data held by a detailed data database 21 described later, or receives ordering of multiple stages held by an order holding unit 22 described later.

The output unit 12 outputs results of the various types of processing performed by the control unit 30, the operation instruction for performing the various types of processing, and the like to a monitor or a printer. Specifically, the output unit 12 outputs a screen for inputting the detailed data by the input unit 11, the detailed data held by the detailed data database 21, and the ordering held by the order holding unit 22 to the monitor.

The input and output control I/F 13 controls data transfer between the input unit 11 and the output unit 12, and between the storage unit 20 and the control unit 30.

The storage unit 20 stores therein data to be used for the various types of processing performed by the control unit 30, and includes the detailed data database 21 and the order holding unit 22, as depicted in FIG. 2, as members closely associated with the present invention. The detailed data database 21 corresponds to a "detailed data database" described in claims, and the order holding unit 22 corresponds to an "order holding procedure" described in the claims.

The detailed data database 21 stores therein the detailed data at each stage of the process executed through multiple stages. Specifically, the detailed data database 21 stores therein the detailed data at each stage of the process executed through multiple stages such as "negotiation", "order acceptance", "sales", or "payment at cost", and the stored detailed data is used for process performed by a forecast detailed-data creating unit 31 or an offset detailed-data creating unit 33 described later. Further, the detailed data database 21 stores therein forecast detailed data created by the forecast detailed-data creating unit 31 and offset detailed data created by the offset detailed-data creating unit 33.

For example, the detailed data database 21 stores therein the detailed data and the forecast detailed data as depicted in (A) in FIG. 3. Here, (A) in FIG. 3 is for explaining an example when the detailed data database 21 receives the detailed data at the stage of "negotiation". Upon reception of the detailed data at the stage of "negotiation", the detailed data database 21 stores therein the detailed data ("negotiation (settled)", . . . , "¥1,200,000", and "20 May (settled)" fixed at the stage of "negotiation". The detailed data database 21 also stores therein forecast detailed data indicating a content predicted from the detailed data for a stage next to the stage of "negotiation" and subsequent stages, that is, the forecast detailed data ("order acceptance (forecast)", . . . , "¥1,200,000", and "30 June (scheduled date for order acceptance) predicted for the stage of "order acceptance", the forecast detailed data ("sales (forecast)", . . . , "¥1,200,000", and "30 June (scheduled date for sales) predicted for the stage of "sales", and the forecast detailed data ("cost (forecast)", . . . , "¥960,000", and "30 June (scheduled date for payment at cost)" predicted for the stage of "payment at cost".

The detailed data database 21 stores therein the detailed data by receiving inputs every time when the detailed data is created in the respective stages, and stores therein the detailed data by receiving the detailed data stored in other databases at a time. On the other hand, the forecast detailed data stored in the detailed data database 21 is data created by the forecast detailed-data creating unit 31 described later from the detailed data stored in the detailed data database 21. Accordingly, it is considered that timing for the detailed data database 21 to store therein the detailed data is normally different from timing for the detailed data database 21 to store therein the forecast detailed data created from the detailed data.

For example, the detailed data database 21 stores therein the detailed data, the forecast detailed data, and the offset detailed data as depicted in (B) in FIG. 3. Here, (B) in FIG. 3 is for explaining an example when the detailed data database 21 receives the detailed data at the stage of "order acceptance" in the state of (A) in FIG. 3. Upon reception of the detailed data at the stage of "order acceptance", the detailed data database 21 stores therein the detailed data (order acceptance (settled), . . . , "¥1,000,000", "20 June (settled)" fixed at the stage of "order acceptance". The detailed data database 21 also stores therein the forecast detailed data indicating a content predicted from the detailed data for a stage next to the stage of "order acceptance" and subsequent stages, that is, the forecast detailed data ("sales (forecast)", . . . , "¥1,000,000", and "30 June (scheduled date for sales) predicted for the stage of "sales", and the forecast detailed data ("cost (forecast)", . . . , "¥800,000", and "30 June (scheduled date for payment at cost)" predicted for the stage of "payment at cost".

Further, the detailed data database 21 stores therein the offset detailed data having a content for offsetting the forecast detailed data created at the immediately previous stage, that is, ("order acceptance (offset)", . . . , "−¥1,200,000", "20 June"), "sales (offset)", . . . , "−¥1,200,000", "June 30th"), and "cost (offset)", . . . , "−¥960,000", "30 June"), respectively, as the offset detailed data having a content for offsetting the forecast detailed data ("order acceptance (forecast)", . . . , "¥1,200,000", "20 June (scheduled date for order acceptance)" predicted for the stage of "order acceptance", the forecast detailed data ("sales (forecast)", . . . , "¥1,200,000", "30 June (scheduled date for sales)" predicted for the stage of "sales", and the forecast detailed data ("cost (forecast)", . . . , "¥960,000", "30 June (scheduled date for payment at cost)" predicted for the stage of "payment at cost".

The offset detailed data stored in the detailed data database 21 is data created by the offset detailed-data creating unit 33 described later. Therefore, it is considered that the timing for the detailed data database 21 to store therein the detailed data is normally different from the timing for the detailed data database 21 to store therein the offset detailed data.

The order holding unit 22 orders and holds the multiple stages. Specifically, the order holding unit 22 orders and holds the stages of the process executed through multiple stages, and the held order is used for the process performed by a determining unit 32 described later.

For example, the order holding unit 22 holds the order as depicted in FIG. 4. Depicted in (A) in FIG. 4 is an example of ordering and holding four stages of "negotiation", "order acceptance", "sales", and "payment at cost" of the process executed through the four stages, such that "negotiation" is associated with "1", "order acceptance" is associated with "2", "sales" is associated with "3", and "payment at cost" is associated with "4". Further, depicted in (B) in FIG. 4 is an example of ordering and holding three stages of "estimate", "order placement", and "acceptance" of the process executed through the three stages, such that "estimate" is associated with "1", "order placement" is associated with "2", and "acceptance" is associated with "3.

The order holding unit 22 holds the order beforehand by receiving an input by a user who uses the detailed data storage apparatus 10.

The control unit 30 controls the detailed data storage apparatus 10 and executes various types of processes. The control unit 30 includes the forecast detailed-data creating unit 31, the determining unit 32, and the offset detailed-data creating unit 33 as depicted in FIG. 2, as members closely associated with the present invention. The determining unit 32 corresponds to a "determining procedure" described in the claims, and the offset detailed-data creating unit 33 corresponds to an "offset detailed-data creating procedure" described in the claims.

The forecast detailed-data creating unit 31 creates the forecast detailed data indicating the content predicted from the detailed data. Specifically, upon reception of the detailed data at a predetermined stage, the forecast detailed-data creating unit 31 creates forecast detailed data and stores the created forecast detailed data in the detailed data database 21.

For example, upon reception of the detailed data at the stage of "negotiation" as depicted in (A) in FIG. 3, as the forecast detailed data stored in the detailed data database 21, the forecast detailed-data creating unit 31 creates the forecast detailed data indicating the content predicted from the detailed data at the stage next to the stage of "negotiation" and subsequent stages, that is, the forecast detailed data (order acceptance (forecast)", . . . , "¥1,200,000", "20 June (scheduled date for order acceptance) predicted for the stage of "order acceptance", the forecast detailed data (sales (forecast)", . . . , "¥1,200,000", "June 30th (scheduled date for sales)" predicted for the stage of "sales", and the forecast detailed data ("cost (forecast)", . . . , "¥960,000", "30 June (scheduled date for payment at cost)" predicted for the stage of "payment at cost".

As depicted in (A) in FIG. 3, the forecast detailed-data creating unit 31 according to the first embodiment also predicts "scheduled date for order acceptance", "scheduled date for sales", and "scheduled date for payment at cost" as date on which the detailed data will may be created. That is, for example, when each stage of the process executed through multiple stages is realized in different systems, the detailed data storage apparatus 10 according to the first embodiment also predicts, for ensuring the consistency of the detailed data between stages, the date on which the detailed data will may be created, to match the time frame.

The determining unit 32 determines whether there is a stage immediately previous the predetermined stage. Specifically, upon reception of the detailed data at the predetermined stage, the determining unit 32 determines whether there is a stage immediately previous the predetermined stage based on the order held by the order holding unit 22, and transmits a determination result to the offset detailed-data creating unit 33.

For example, upon reception of the detailed data at the stage of "order acceptance", the determining unit 32 determines whether there is a stage immediately previous to the stage of "order acceptance" based on the order depicted in (A) in FIG. 4 as the order held by the order holding unit 22, and determines that there is the stage of "negotiation", which is the immediately previous stage.

The offset detailed-data creating unit 33 creates the offset detailed data indicating the content for offsetting the forecast detailed data created at the immediately previous stage. Specifically, when the determining unit 32 determines that there is an immediately previous stage, the offset detailed-data creating unit 33 creates the offset detailed data and stores the created offset detailed data in the detailed data database 21.

A concept of offset of the forecast detailed data is explained with reference to FIG. 5. FIG. 5 depicts a conceptual relation between the detailed data stored at each stage and the forecast detailed data created from the stored detailed data, and the offset detailed data to be created at the next stage, in the process executed through the four stages of "negotiation", "order acceptance", "sales", and "payment at cost".

For example, when the stage of "negotiation" depicted in FIG. 5 is reviewed, upon reception of detailed data at the stage of "negotiation", the detailed data storage apparatus 10 stores detailed data ("A" and "+") fixed at the stage of "negotiation" in the detailed database 21. The detailed data storage apparatus 10 stores forecast detailed data ("A" and "+") predicted for the stage of "order acceptance", forecast detailed data ("A" and "+") predicted for the stage of "sales", and forecast detailed data ("A" and "+") predicted for the stage of "payment at cost" in the detailed data database 21. Because these values are positive values, these are expressed by a mark "+" in FIG. 5.

On the other hand, when the stage of "order acceptance" depicted in FIG. 5 is reviewed, upon reception of detailed data at the stage of "order acceptance", the detailed data storage apparatus 10 stores detailed data "O" and "+") fixed at the stage of "order acceptance" in the detailed data database 21. The detailed data storage apparatus 10 also stores forecast detailed data ("O" and "+") predicted for the stage of "sales", and forecast detailed data ("O" and "+") predicted for the stage of "payment at cost" in the detailed data database 21. Because these values are also positive values, these are expressed by the mark "+" in FIG. 5.

In the detailed data storage apparatus 10, the determining unit 32 determines whether there is a stage immediately previous to the stage of "order acceptance". When the determining unit 32 determines that there is a stage immediately previous to the stage of "order acceptance", the offset detailed-data creating unit 33 creates offset detailed data ("A" and "−") for offsetting the forecast detailed data at the stage of "order acceptance", offset detailed data ("A" and "−") for offsetting the forecast detailed data at the stage of "sales", and offset detailed data ("A" and "−") for offsetting the forecast detailed data at the stage of "payment at cost". Because these values are negative values, these are expressed by a mark "−" in FIG. 5. A term "reconcile" in FIG. 5 means that the offset detailed data reconciles the forecast detailed data (a positive value and a negative value are stored in the same database, thereby reconciling the positive value).

The concept described above is explained by way of a specific example. For example, as depicted in FIG. 3(B), upon reception of the detailed data at the stage of "order acceptance", the offset detailed-data creating unit 33 creates ("order acceptance (offset)", . . . , "−¥1,200,000", "20 June"), (sales (offset)", . . . , "−¥1,200,000", "30 June"), and "cost (offset)", . . . , "−¥960,000", "30 June"), as the offset detailed data indicating the content for offsetting the forecast detailed data (("order acceptance (forecast)", . . . , "¥1,200,000", "20 June (scheduled date for order acceptance)"), ("sales (forecast), . . . , "¥1,200,000", "30 June (scheduled date for sales)"), and ("cost (forecast), . . . , "¥960,000", "30 June (scheduled date for payment at cost)") created at the stage of "negotiation".

[Process Procedure Performed by Detailed Data Storage Apparatus According to First Embodiment]

Figure 6:
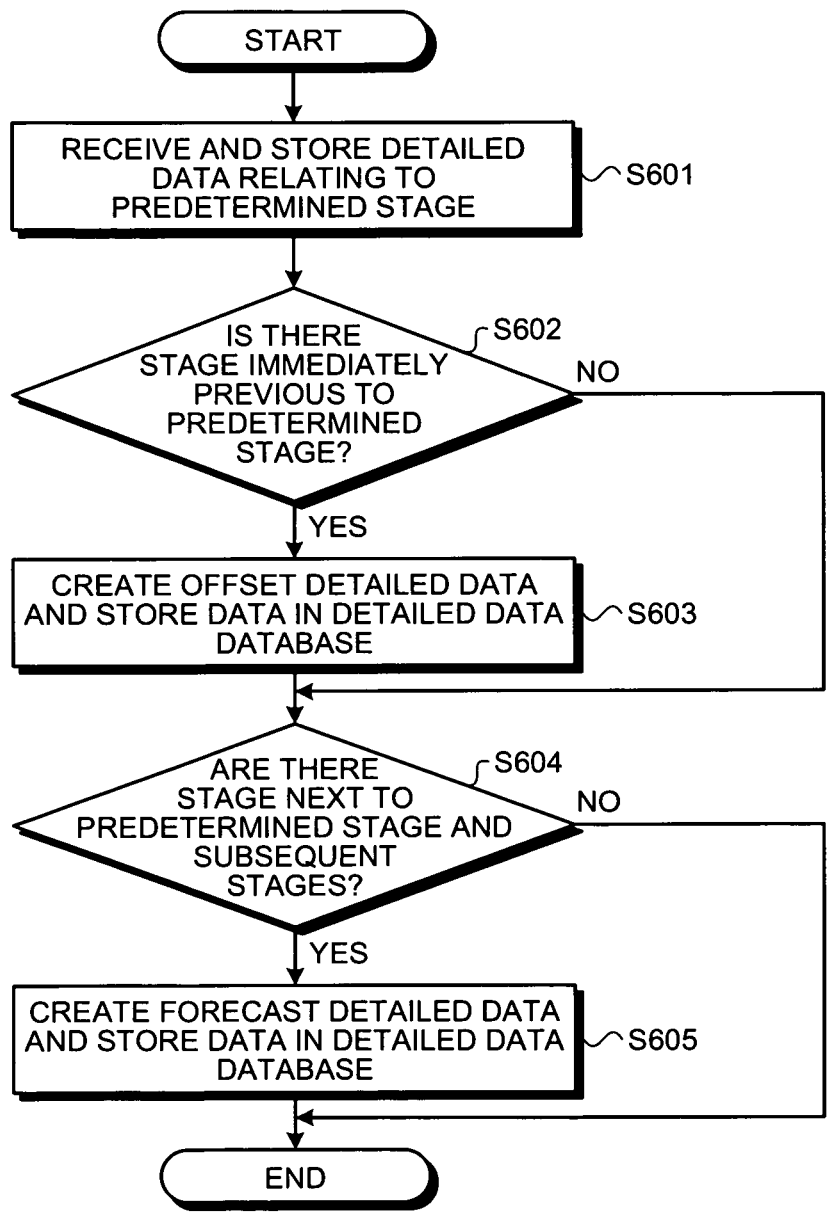
FIG. 6 is a flowchart of a process procedure performed by the detailed data storage apparatus according to the first embodiment.

One example of a process performed by the detailed data storage apparatus according to the first embodiment is explained. FIG. 6 is a flowchart of a process procedure performed by the detailed data storage apparatus according to the first embodiment.

The detailed data storage apparatus 10 according to the first embodiment receives detailed data at a predetermined stage and stores the detailed data in the detailed data database 21 (Step S601). For example, the detailed data storage apparatus 10 receives the detailed data at the stage of "order acceptance" and stores the detailed data in the detailed data database 21.

Next, in the detailed data storage apparatus 10, the determining unit 32 determines whether there is a stage immediately previous to a predetermined stage (Step S602). For example, in the detailed data storage apparatus 10, the determining unit 32 determines whether there is a stage immediately previous to the stage of "order acceptance".

As a result of determination, when there is no immediately previous stage (NO at Step S602), the detailed data storage apparatus 10 proceeds to the process at Step S604. On the other hand, as a result of determination, when there is an immediately previous stage (YES at Step S602), the detailed data storage apparatus 10 creates offset detailed data and stores the offset detailed data in the detailed data database 21 (Step S603). For example, when there is the stage of "negotiation" as an immediately previous stage, the detailed data storage apparatus 10 creates the offset detailed data indicating the content for offsetting the forecast detailed data created at the stage of "negotiation" and stores the offset detailed data in the detailed data database 21.

Subsequently, the detailed data storage apparatus 10 determines whether there is a stage next to the predetermined stage and subsequent stages (Step S604). For example, the detailed data storage apparatus 10 determines whether there is the stage next to the stage of "order acceptance" and the subsequent stages.

As a result of determination, when there are not the next and subsequent stages (NO at Step S604), the detailed data storage apparatus 10 finishes the processing. On the other hand, when there are the next and subsequent stages (YES at Step S604), the detailed data storage apparatus 10 creates the forecast detailed data and stores the forecast detailed data in the detailed data database 21 (Step S605).

For example, when there are the stages of "sales" and "payment at cost" as the next and subsequent stages, the detailed data storage apparatus 10 creates the forecast detailed data indicating the content predicted from the detailed data of the stage of "order acceptance" for each stage and stores the forecast detailed data in the detailed data database 21. The detailed data storage apparatus 10 also predicts, for example, "scheduled date for sales" and "scheduled date for payment at cost" as the date on which the detailed data will may be created.

Thus, the detailed data storage apparatus according to the first embodiment can ensure the consistency of the detailed data between the stages in the process executed through multiple stages.

In the first embodiment, the procedure in which the forecast detailed data is created after having created the offset detailed data has been explained as the process procedure performed by the detailed data storage apparatus 10. However, the present invention is not limited thereto, and any order can be used in the procedure in which creation process of the offset detailed data and creation process of the forecast detailed data are performed under a predetermined condition.

[Effects of First Embodiment]

According to the first embodiment, there is provided a detailed data storage apparatus for creating, when the detailed data database that stores therein the detailed data at each stage of a process executed through multiple stages receives the detailed data at a predetermined stage, the forecast detailed data indicating contents predicted for a stage next to a predetermined stage and the subsequent stages from the detailed data, and storing the forecast detailed data in the detailed data database. The multiple stages are ordered and held. When the detailed data at the predetermined stage is received, it is determined whether there is a stage immediately previous to the predetermined stage based on the held order. If it is determined that there is a stage immediately previous to the predetermined stage, offset detailed data including a content for offsetting the forecast detailed data created at the immediately previous stage is created and stored in the detailed data database. Accordingly, the consistency of the detailed data between the stages in the process executed through multiple stages can be ensured.

[b] Second Embodiment

As the first embodiment, the method of creating the offset detailed data indicating the content for offsetting the forecast detailed data created at the immediately-preceding stage and storing the offset detailed data in the detailed data database, upon reception of the detailed data at a predetermined stage has been explained. However, the embodiment of the present invention is not limited thereto, and a method of combining update type detailed data (detailed data to be updated at a predetermined update time) and occasionally generated type detailed data (detailed data to be occasionally generated) and storing the detailed data in the detailed data database is also included as one embodiment of the present invention. An outline and features of a detailed data storage apparatus according to a second embodiment, the configuration and process procedures of a detailed data storage apparatus according to the second embodiment, and effects of the second embodiment are explained below in this order.

[Outline and Features of Detailed Data Storage Apparatus According to Second Embodiment]

Figure 7:
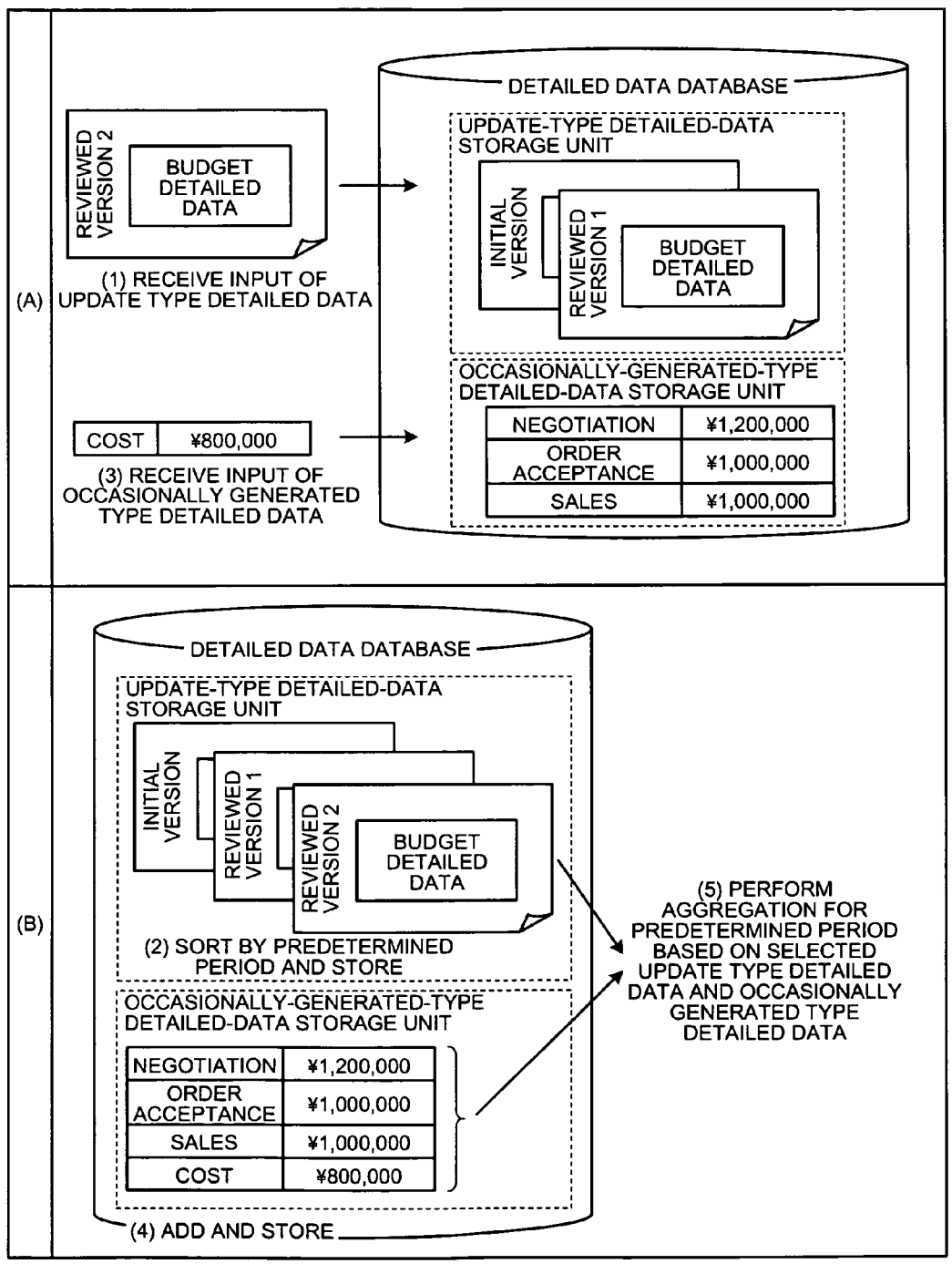
FIG. 7 is an explanatory diagram of an outline and characteristics of a detailed data storage apparatus according to a second embodiment.

The outline and features of the detailed data storage apparatus according to the second embodiment are explained with reference to FIG. 7. FIG. 7 is an explanatory diagram of the outline and features of the detailed data storage apparatus according to the second embodiment.

As the outline, the detailed data storage apparatus according to the second embodiment stores detailed data, which have been accepted to be input, in a detailed data database and performs aggregation of the detailed data. As a main feature, consistency of the detailed data between different types (between the update type detailed data and the occasionally generated type detailed data) is ensured.

The main feature is briefly explained. The detailed data storage apparatus according to the second embodiment holds the detailed data database that includes an update-type detailed-data storage unit that sorts the update type detailed data (detailed data to be updated at a predetermined update time) by update time and stores therein the sorted update type detailed data, and an occasionally-generated-type detailed-data storage unit that stores therein the occasionally-generated type detailed data (detailed data to be occasionally generated).

For example, with reference to an example depicted in FIG. 7(A), the update-type detailed-data storage unit of the detailed data database stores therein "budget detailed data" as the update type detailed data, sorted into "initial version" and "reviewed version 1". The occasionally-generated-type detailed-data storage unit stores therein pieces of data such as "negotiation, ¥1,200,000", "order acceptance, ¥1,000,000", and "sales, ¥1,000,000" as the occasionally generated type detailed data.

In such a configuration, the detailed data storage apparatus according to the second embodiment receives an input of the update type detailed data (see (1) in FIG. 7(A)). For example, the detailed data storage apparatus receives an input of "budget detailed data" of "reviewed version 2" as the update type detailed data.

The detailed data storage apparatus stores the update type detailed data in the detailed data database, sorted by update time (see (2) in FIG. 7(B)). For example, the detailed data storage apparatus stores "budget detailed data" of "reviewed version 2" in the detailed data database, allocated to the "reviewed version 2" separate from the "budget detailed data" of "initial version" or "reviewed version 1".

Further, the detailed data storage apparatus according to the second embodiment receives an input of the occasionally generated type detailed data (see (3) in FIG. 7(A)). For example, the detailed data storage apparatus receives an input of "cost, ¥800,000" as the occasionally generated detailed data.

The detailed data storage apparatus adds and stores the occasionally generated type detailed data in the detailed data database (see (4) in FIG. 7(B)). For example, the detailed data storage apparatus stores "cost, ¥800,000" in addition to the already stored "negotiation, ¥1,200,000", "order acceptance, ¥1,000,000", and "sales, ¥1,000,000".

The detailed data storage apparatus according to the second embodiment selects a piece of the update type detailed data relating to a predetermined time stored in the update-type detailed-data storage unit, and performs aggregation with respect to the predetermined time using the selected update type detailed data and the occasionally generated type detailed data stored in the occasionally-generated-type detailed-data storage unit (see (5) in FIG. 7(B)). For example, the detailed data storage apparatus selects "budget detailed data" in "reviewed version 2", and performs aggregation using the selected "budget detailed data" in "reviewed version 2" with "negotiation, ¥1,200,000", "order acceptance, ¥1,000,000", "sales, ¥1,000,000", and "cost, ¥800,000" corresponding to "reviewed version 2".

The detailed data storage apparatus according to the second embodiment can ensure the consistency of the detailed data between the different types (between the update type detailed data and the occasionally generated type detailed data).

The detailed data storage apparatus according to the second embodiment has a feature in addition to the above-described main feature. That is, the detailed data storage apparatus according to the second embodiment also includes an update-type detailed-data aggregate-result storage unit that aggregates pieces of the update type detailed data for each update time, sorts aggregate results of the update type detailed data by update time, and stores therein the aggregate result, and an occasionally-generated type detailed-data aggregate-result storage unit that aggregates pieces of the occasionally generated type detailed data and stores therein an aggregate result of the occasionally generated type detailed data, so that an aggregate result of the update type detailed data relating to a predetermined time is selected to perform aggregation with respect to the predetermined time using the selected aggregate result of the update type detailed data and the aggregate result of the occasionally generated type detailed data.

[Configuration of Detailed Data Storage Apparatus According to Second Embodiment]

Figure 8:
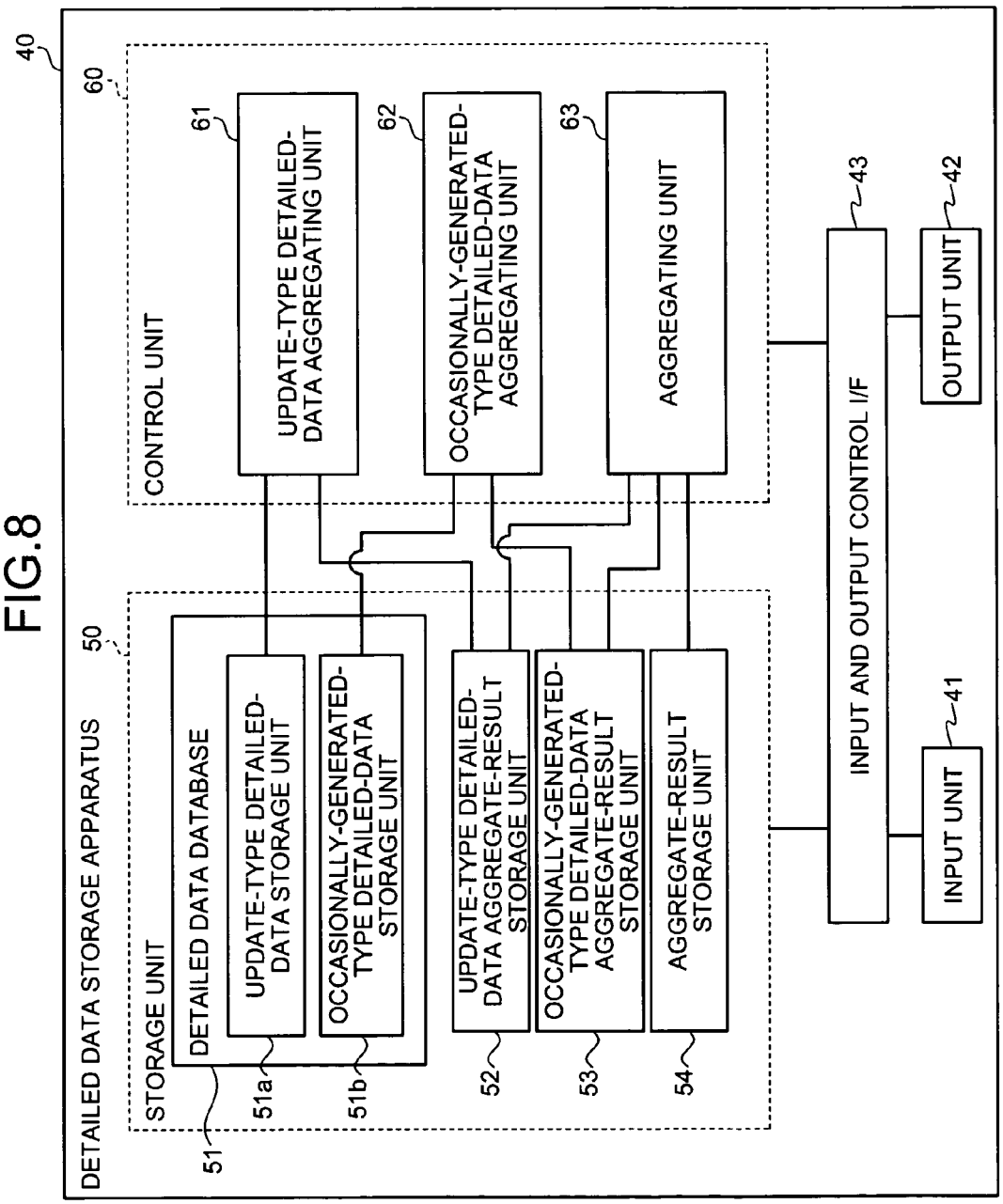
FIG. 8 is a block diagram of a configuration of the detailed data storage apparatus according to the second embodiment.

The detailed data storage apparatus according to the second embodiment is explained with reference to FIGS. 8 to 15. FIG. 8 is a block diagram of a configuration of the detailed data storage apparatus according to the second embodiment; FIG. 9 is an explanatory diagram of the update-type detailed-data storage unit; FIG. 10 is an explanatory diagram of the occasionally-generated-type detailed-data storage unit; FIG. 11 is an explanatory diagram of the update-type detailed-data aggregate-result storage unit; FIG. 12 is an explanatory diagram of the occasionally-generated-type detailed-data aggregate-result storage unit; FIG. 13 is an explanatory diagram of an aggregate-result storage unit; and FIGS. 14 and 15 are explanatory diagrams of an aggregating unit.

As depicted in FIG. 8, a detailed data storage apparatus 40 according to the second embodiment includes an input unit 41, an output unit 42, an input and output control I/F 43, a storage unit 50, and a control unit 60.

The input unit 41 receives data used in the control unit 60, an operation instruction for performing various types of processing, and the like through a keyboard, a mouse, a recording medium, or communication. Specifically, the input unit 41 receives detailed data stored in an update-type detailed-data storage unit 51a and an occasionally-generated-type detailed-data storage unit 51b described later, or receives an operation instruction for instructing aggregation (for example, specifying a predetermined time) by an aggregating unit 63 described later.

The output unit 42 outputs results of the various types of processes performed by the control unit 60, the operation instruction for performing the various types of processes, and the like to a monitor or a printer. Specifically, the output unit 42 outputs a screen for inputting the detailed data by the input unit 41 and aggregate results stored in an aggregate-result storage unit 54 to the monitor.

The input and output control I/F 43 controls data transfer between the input unit 41 and the output unit 42, and between the storage unit 50 and the control unit 60.

The storage unit 50 stores therein data to be used for various types of processes performed by the control unit 60. Particularly, the storage unit 50 includes, as depicted in FIG. 8, a detailed data database 51 (which includes the update-type detailed-data storage unit 51a and the occasionally-generated-type detailed-data storage unit 51b), an update-type detailed-data aggregate-result storage unit 52, an occasionally-generated-type detailed-data aggregate-result storage unit 53, and the aggregate-result storage unit 54, as members closely associated with the present invention. The detailed data database 51 corresponds to the "detailed data database", the update-type detailed-data storage unit 51a corresponds to an "update-type detailed-data storing procedure", the occasionally-generated-type detailed-data storage unit 51b corresponds to an "occasionally-generated-type detailed-data storing procedure", the update-type detailed-data aggregate-result storage unit 52 corresponds to an "update-type detailed-data aggregate result storing procedure", and the occasionally-generated-type detailed-data aggregate-result storage unit 53 corresponds to an "occasionally-generated-type detailed-data aggregate result storing procedure", respectively described in the claims.

The update-type detailed-data storage unit 51a stores therein update-type detailed data (detailed data to be updated at a predetermined update time). Specifically, upon reception of an input of the update-type detailed data, the update-type detailed-data storage unit 51a stores therein the update-type detailed data, sorted by update time. The stored update-type detailed data is used for process performed by an update-type detailed-data aggregating unit 61 described later.

For example, the update-type detailed-data storage unit 51a stores therein detailed data as depicted in FIG. 9. An example depicted in FIG. 9 is explained. FIG. 9 depicts detailed data of budget updated of a predetermined time as the update-type detailed data. The detailed data relating to the budget has been updated at two times, as seen from the "initial version" and "reviewed version 1".

The detailed data relating to the budget depicted in FIG. 9 includes "year/month", "budget/performance category", "account title", "section", and "amount" in both the "initial version" and "reviewed version 1". When reviewing a content of the "initial version", budget of section "Sales 1" for year/month of "2006 April" is "¥100", budget of section "Sales 2" for year/month of "2006 April" is "¥200", budget of section "Sales 1" for year/month of "2006 May" is "¥200", and budget of section "Sales 2" for year/month of "2006 May" is "¥200". These four pieces of detailed data are stored at a time in the update-type detailed-data storage unit 51a. On the other hand, when reviewing the content of the "reviewed version 1", the budget "¥110" of section "Sales 1" for year/month of "2006 April" and the budget "¥220" of section "Sales 2" for year/month of "2006 April" are different from those in the "initial version". The four pieces of detailed data in the "reviewed version 1" are also stored at a time in the update-type detailed-data storage unit 51a.

The occasionally-generated-type detailed-data storage unit 51b stores therein occasionally generated type detailed data (detailed data to be occasionally generated). Specifically, upon reception of an input of occasionally generated type detailed data, the occasionally-generated-type detailed-data storage unit 51b stores therein the occasionally-generated type detailed data, and the stored occasionally generated type detailed data is used for process performed by an occasionally-generated-type detailed-data aggregating unit 62 described later.

For example, the occasionally-generated-type detailed-data storage unit 51b stores therein detailed data as depicted in FIG. 10. An example depicted in FIG. 10 is explained. FIG. 10 depicts detailed data relating to order acceptance, sales, and cost (hereinafter, "detailed data relating to order acceptance and the like") as the occasionally generated type detailed data. The occasionally-generated-type detailed-data storage unit 51b adds and stores therein detailed data relating to order acceptance and the like on each generation thereof, as seen from "version 0 (settled)".

The detailed data relating to order acceptance and the like depicted in FIG. 10 includes values corresponding to items of "year/month", "budget/performance category", "account title", "section", and "amount". When reviewing a specific content, performance of section "Sales 1" for year/month of "2006 April" is "¥100", performance of section "Sales 2" for year/month of "2006 April" is "¥250", performance of section "Sales 1" for year/month of "2006 May" is "¥200", and performance of section "Sales 2" for year/month of "2006 May" is "¥150". These four pieces of detailed data are added and stored in the occasionally-generated-type detailed-data storage unit 51b every time individual detailed data is generated.

The update-type detailed-data aggregate-result storage unit 52 stores therein aggregate results of the update-type detailed data (aggregate result obtained by aggregating pieces of the update-type detailed data for each update time). Specifically, the update-type detailed-data aggregate-result storage unit 52 stores therein the aggregate results obtained by the update-type detailed-data aggregating unit 61 described later, sorted by update time. The stored aggregate results of the update-type detailed data are used for the process performed by the aggregating unit 63 described later.

For example, the update-type detailed-data aggregate-result storage unit 52 stores therein the aggregate results depicted in FIG. 11. An example depicted in FIG. 11 is explained. FIG. 11 depicts aggregate results of the update-type detailed data obtained by aggregating pieces of the update-type detailed data depicted in FIG. 9. As seen from the "initial version" and "reviewed version 1", the aggregate results of the update type detailed data are obtained by aggregating pieces of the update type detailed data for each update time, sorted by the update time, and stored.

The aggregate result of the update-type detailed data depicted in FIG. 11 includes "year/month", "budget/performance category", and "account title" as aggregation items, and "amount" as a counting item, in both the "initial version" and "reviewed version 1". When reviewing the content of the "initial version", the budget for the year/month of "2006 April" is "¥300", and the budget for the year/month of "2006 May" is "¥400". These two aggregate results are obtained by the update-type detailed-data aggregating unit 61 and stored at a time in the update-type detailed-data aggregate-result storage unit 52. On the other hand, when reviewing the content of "reviewed version 1", the budget "¥330" for the year/month of "2006 April" is different from that in the "initial version". Similarly for the detailed data in "reviewed version 1", the two aggregate results are obtained by the update-type detailed-data aggregating unit 61 and stored at a time in the update-type detailed-data aggregate-result storage unit 52.

The occasionally-generated-type detailed-data aggregate-result storage unit 53 stores therein an aggregate result of the occasionally generated type detailed data (aggregate results obtained by aggregating pieces of the occasionally generated type detailed data). Specifically, the occasionally-generated-type detailed-data aggregate-result storage unit 53 stores therein the aggregate result obtained by the occasionally-generated-type detailed-data aggregating unit 62 described later, and the stored aggregate result of the occasionally generated type detailed data is used for the process performed by the aggregating unit 63 described later.

For example, the occasionally-generated-type detailed-data aggregate-result storage unit 53 stores therein an aggregate result as depicted in FIG. 12. An example depicted in FIG. 12 is explained. FIG. 12 depicts the aggregate result of the occasionally generated type detailed data obtained by aggregating the occasionally-generated type detailed data depicted in FIG. 10.

The aggregate result of the occasionally generated type detailed data depicted in FIG. 12 includes "year/month", "budget/performance category", and "account title" as aggregation items, and "amount" as the counting item. When reviewing the specific content, the performance for the year/month of "2006 April" is "¥350", and the performance for the year/month of "2006 May" is "¥350". These two aggregate results are obtained by the occasionally-generated-type detailed-data aggregating unit 62 and stored at a time in the occasionally-generated-type detailed-data aggregate-result storage unit 53.

The aggregate-result storage unit 54 stores therein the aggregate results. Specifically, the aggregate-result storage unit 54 stores therein the aggregate results obtained by the aggregating unit 63 described later, and the stored aggregate results are output to the output unit 42 later by a user who uses the detailed data storage apparatus 40.

For example, the aggregate-result storage unit 54 stores therein the aggregate results as depicted in FIG. 13. An example depicted in FIG. 13 is explained. FIG. 13 indicates the aggregate results obtained by aggregating the aggregate result of update type detailed data depicted in FIG. 11 and the aggregate result of occasionally generated type detailed data depicted in FIG. 12. As seen from "budget/performance comparison initial version" and "budget/performance comparison reviewed version", the aggregate results are obtained through aggregation with respect to a predetermined time and, sorted by predetermined time, and stored.

The "budget/performance comparison initial version" is obtained by aggregating the aggregate result of the update type detailed data in the "initial version" stored in the update-type detailed-data aggregate-result storage unit 52 and the aggregate result of the occasionally generated type detailed data stored in the occasionally-generated-type detailed-data aggregate-result storage unit 53. On the other hand, the "budget/performance comparison reviewed version" is obtained by aggregating the aggregate result of the update type detailed data in the "reviewed version 1" stored in the update-type detailed-data aggregate-result storage unit 52 and the aggregate result of the occasionally generated type detailed data stored in the occasionally-generated-type detailed-data aggregate-result storage unit 53. Each of the "budget/performance comparison initial version" and the "budget/performance comparison current version" is data obtained by storing at a time the aggregate results, which are aggregated by the aggregating unit 63, in the aggregate-result storage unit 54.

The control unit 60 controls the detailed data storage apparatus 40 to execute various types of processes. The control unit 60 includes, as depicted in FIG. 8, the update-type detailed-data aggregating unit 61, the occasionally-generated-type detailed-data aggregating unit 62, and the aggregating unit 63 as members closely associated with the present invention. The update-type detailed-data aggregating unit 61 corresponds to an update-type detailed-data aggregating procedure" described in the claims, the occasionally-generated-type detailed-data aggregating unit 62 corresponds to an "occasionally-generated-type detailed-data aggregating procedure" described in the claims, and the aggregating unit 63 corresponds to an "aggregating procedure" described in the claims.

The update-type detailed-data aggregating unit 61 aggregates pieces of the update-type detailed data with respect to a predetermined time. Specifically, the update-type detailed-data aggregating unit 61 aggregates pieces of the update-type detailed data stored in the update-type detailed-data storage unit 51a with respect to a predetermined time, and an aggregate result of the aggregated update-type detailed data is stored in the update-type detailed-data aggregate-result storage unit 52.

For example, aggregation performed by the update-type detailed-data aggregating unit 61 is explained with reference to FIGS. 14 and 15. The aggregation performed by the update-type detailed-data aggregating unit 61 corresponds to "aggregation process 1" in FIGS. 14 and 15. As depicted in FIG. 14, the update-type detailed-data aggregating unit 61 aggregates pieces of the detailed data relating to budget with respect to a predetermined time (initial version, reviewed version 1, and reviewed version 2) as the update-type detailed data, and "initial version of budget aggregate", "reviewed version 1 of budget aggregate", and "reviewed version 2 of budget aggregate" are stored in the update-type detailed-data aggregate-result storage unit 52 as aggregate results of the aggregated update-type detailed data (see aggregate result 1 in FIG. 14). Likewise, the update-type detailed-data aggregating unit 61 aggregates pieces of the data relating to negotiation with respect to a predetermined time (version 1, and version 2) and "version 1 of negotiation aggregate" and "version 2 of negotiation aggregate" are stored in the update-type detailed-data aggregate-result storage unit 52 as aggregate results of the aggregated update-type detailed data (see aggregate result 1 in FIG. 14). FIG. 15 is for explaining the aggregation performed by the update-type detailed-data aggregating unit 61 with specific values, and respective tables have been explained with reference to FIGS. 9 to 13.

The occasionally-generated-type detailed-data aggregating unit 62 aggregates occasionally generated type detailed data. Specifically, the occasionally-generated-type detailed-data aggregating unit 62 aggregates pieces of the occasionally-generated type detailed data stored in the occasionally-generated-type detailed-data storage unit 51b, and an aggregate result of the aggregated occasionally generated type detailed data is stored in the occasionally-generated-type detailed-data aggregate-result storage unit 53.

For example, the aggregation performed by the occasionally-generated-type detailed-data aggregating unit 62 is explained with reference to FIGS. 14 and 15. The aggregation performed by the occasionally-generated-type detailed-data aggregating unit 62 corresponds to "aggregation process 2" in FIGS. 14 and 15. As depicted in FIG. 14, the occasionally-generated-type detailed-data aggregating unit 62 aggregates pieces of the detailed data relating to order acceptance and the like as the occasionally generated type detailed data, and the "aggregate of order acceptance/sales/cost" is stored in the occasionally-generated-type detailed-data aggregate-result storage unit 53 as an aggregate result of the aggregated occasionally generated type detailed data (see aggregate result 1 in FIG. 14). FIG. 15 is for explaining the aggregation performed by the occasionally-generated-type detailed-data aggregating unit 62 with specific values.

The aggregating unit 63 aggregates an aggregate result of a selected update-type detailed data and an aggregate result of the occasionally-generated type detailed data with respect to a predetermined time. Specifically, the aggregating unit 63 selects one of the aggregate results of the update-type detailed data with respect to a predetermined time stored in the update-type detailed-data aggregate-result storage unit 52, and performs aggregation with respect to the predetermined time using the selected aggregate result of the update-type detailed data and the aggregate result of the occasionally generated type detailed data stored in the occasionally-generated-type detailed-data aggregate-result storage unit 53. The aggregated aggregate result is stored in the aggregate-result storage unit 54.

For example, aggregation by the aggregating unit 63 is explained with reference to FIGS. 14 and 15. The aggregation by the aggregating unit 63 corresponds to the "aggregation process 2" in FIGS. 14 and 15. As depicted in FIG. 14, the aggregating unit 63 selects "reviewed version 2 of budget aggregate" and "version 2 of negotiation aggregate" as the aggregate result of the update-type detailed data at a predetermined time, and aggregates the selected "reviewed version 2 of budget aggregate" and "version 2 of negotiation aggregate" with the stored "aggregate of order acceptance/sales/cost" as the stored aggregate result of the occasionally generated type detailed data with respect to the predetermined time (current version). A "current version of aggregate result file" is stored in the aggregate-result storage unit 54 as the aggregated aggregate result (see aggregate result 2 in FIG. 14).

Likewise, the aggregating unit 63 selects the "initial version of budget aggregate" and "version 1 of negotiation aggregate" as the aggregate result of the update-type detailed data at a predetermined time, and aggregates the selected "initial version of budget aggregate" and "version 1 of negotiation aggregate" with the stored "aggregate of order acceptance/sales/cost" as the stored aggregate result of the occasionally generated type detailed data with respect to the predetermined time (current version). A "current version of aggregate result file" is stored in the aggregate-result storage unit 54 as the aggregated aggregate result (see aggregate result 2 in FIG. 14). FIG. 15 is for explaining the aggregation performed by the aggregating unit 63 with specific values.

[Process Procedure of Detailed Data Storage Apparatus According to Second Embodiment]

Figure 16:
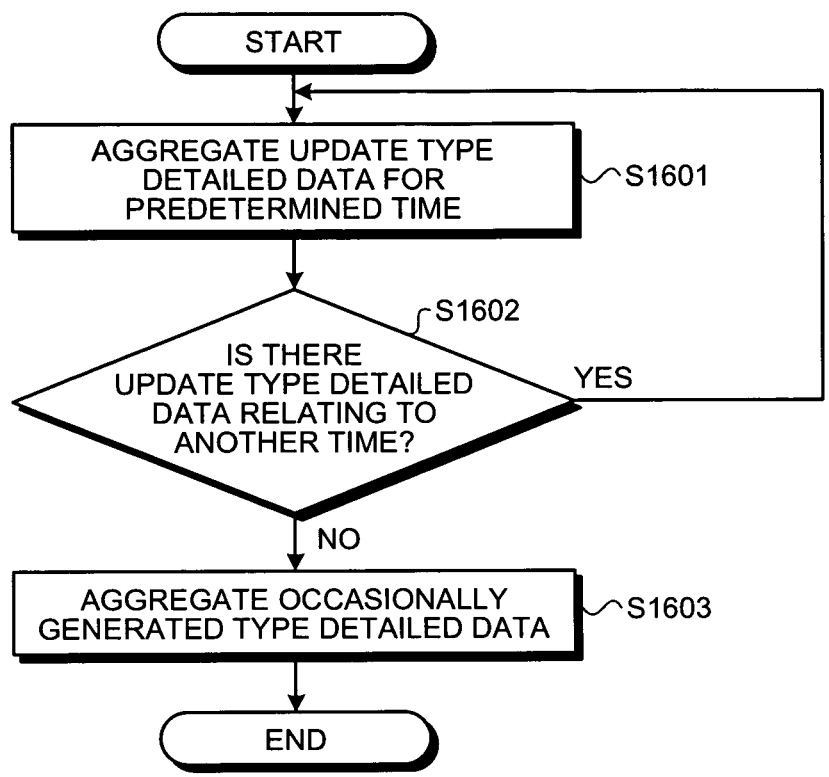
FIG. 16 is a flowchart of a process procedure (an aggregation process 1) performed by the detailed data storage apparatus according to the second embodiment.
Figure 17:
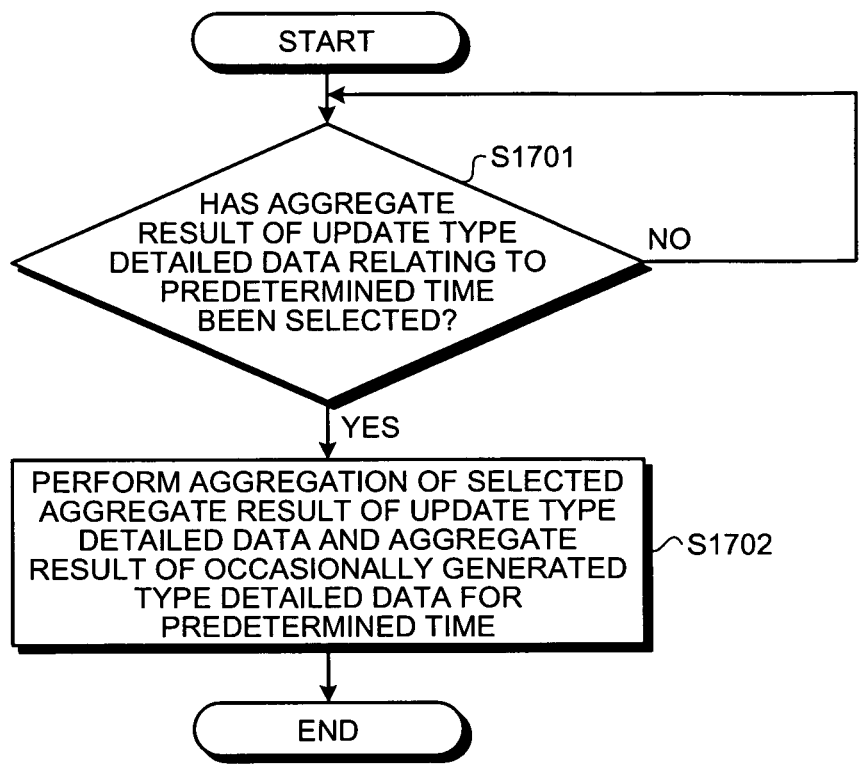
FIG. 17 is a flowchart of a process procedure (an aggregation process 2) performed by the detailed data storage apparatus according to the second embodiment.

One example of processing performed by the detailed data storage apparatus according to the second embodiment is explained with reference to FIGS. 16 and 17. FIG. 16 is a flowchart of a process procedure (the aggregation process 1) performed by the detailed data storage apparatus according to the second embodiment. FIG. 17 is a flowchart of a process procedure (the aggregation process 2) performed by the detailed data storage apparatus according to the second embodiment.

[Aggregation Process 1]

The detailed data storage apparatus 40 according to the second embodiment aggregates update-type detailed data for a predetermined time (Step S1601).

The detailed data storage apparatus 40 then determines whether there is the update-type detailed data relating to another time (Step S1602). If there is the update-type detailed data relating to another time (YES at Step S1602), the detailed data storage apparatus 40 returns to the process of aggregating the update-type detailed data for a predetermined time.

On the other hand, if there is no update-type detailed data relating to another time (NO at Step S1602), the detailed data storage apparatus 40 aggregates occasionally generated type detailed data (Step S1603).

In the second embodiment, a process procedure in which after the update-type detailed data is aggregated, the occasionally generated type detailed data is aggregated is explained as an example. However, the present invention is not limited thereto, and for example, aggregation timing can be such that the update-type detailed data is aggregated every time when the detailed data is updated (every time when the detailed data is stored in the update-type detailed-data storage unit 51a) and the occasionally generated type detailed data is aggregated according to need.

[Aggregation Process 2]

The detailed data storage apparatus 40 according to the second embodiment first determines whether the aggregate result of the update-type detailed data relating to a predetermined time has been selected (Step S1701). If the aggregate result has not been selected (NO at Step S1701), the detailed data storage apparatus 40 returns to the process of selecting the aggregate result of the update-type detailed data relating to a predetermined time.

On the other hand, when the aggregate result has been selected (YES at Step S1701), the detailed data storage apparatus 40 performs aggregation of the selected aggregate result of the update-type detailed data and the aggregate result of the occasionally generated type detailed data for the predetermined time (Step S1702).

Thus, the detailed data storage apparatus according to the second embodiment can ensure the consistency of the detailed data between the different types (between the update type detailed data and the occasionally generated type detailed data).

[Effects of Second Embodiment]

According to the second embodiment, there is provided a detailed data storage apparatus for storing detailed data, which have been accepted to be input, in the detailed data database and performing aggregation of the detailed data. When an input of the update type detailed data to be updated at a predetermined update time is received, the update type detailed data is stored, sorted by update time. When an input of the occasionally generated type detailed data to be occasionally generated is received, the occasionally generated type detailed data is added and stored. A piece of the stored update type detailed data relating to a predetermined time is selected, and the selected update-type detailed data and the stored occasionally generated type detailed data are aggregated for the predetermined time. Accordingly, the consistency of the detailed data between the different types (between the update type detailed data and the occasionally generated type detailed data) can be ensured.

Further, according to the second embodiment, the detailed data storage apparatus aggregates the stored update type detailed data for each update time, aggregates the stored occasionally generated type detailed data, stores the aggregate result of the aggregated update-type detailed data sorted by update time, and stores the aggregate result of the aggregated occasionally generated type detailed data. The detailed data storage apparatus then selects one of the stored aggregate results of the update-type detailed data relating to a predetermined time, to perform aggregation for the predetermined time using the selected aggregate result of the update type detailed data and the stored aggregate result of the occasionally generated type detailed data. Accordingly, the aggregate results of the update type detailed data and the occasionally generated type detailed data are stored once, and aggregation is performed using the stored aggregate results (the aggregate result of the update-type detailed data and the aggregate result of the occasionally generated type detailed data) with respect to the predetermined time. Therefore, when aggregation with respect to different another update time is performed, the stored aggregate results can be used, thereby enabling high speed aggregation.

[c] Third Embodiment

The detailed data storage apparatuses according to the first and second embodiments have been explained. However, the present invention can be implemented in various different configurations other than the above embodiments. Therefore, various different configurations are explained below as a detailed data aggregation apparatus according to a third embodiment.

In the second embodiment, a method of storing aggregate results of the update type detailed data and the occasionally generated type detailed data once and performing aggregation with respect to a predetermined time using the stored aggregate results (aggregate result of the update type detailed data and aggregate result of the occasionally generated type detailed data) has been explained. However, the present invention is not limited thereto, and the present invention is also applicable to a method of directly performing aggregation with respect to a predetermined time based on the update type detailed data and the occasionally generated type detailed data.

[Programs]

Figure 18:
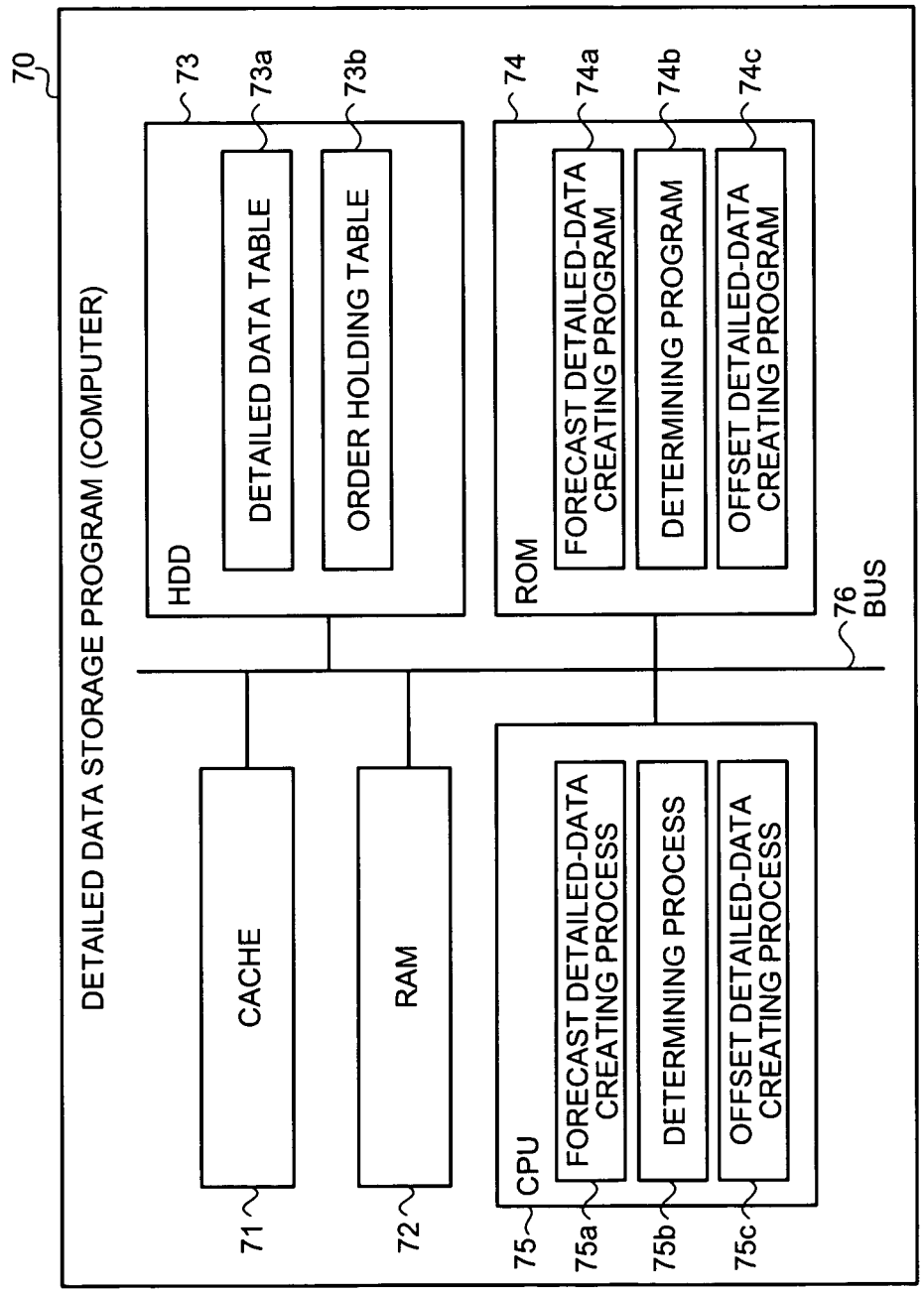
FIG. 18 depicts a computer that executes a detailed data storage program.

The various types of processing explained in the first embodiment can be realized by executing a program prepared beforehand by a computer such as a personal computer or workstation. Therefore, one example of a computer that executes a detailed data storage program having the same functions as those in the first embodiment is explained with reference to FIG. 18. FIG. 18 depicts a computer that executes the detailed data storage program.

As depicted in FIG. 18, a computer 70 as the detailed data storage program is configured by connecting a cache 71, a RAM 72, an HDD 73, a ROM 74, and a CPU 75 by a bus 76. A detailed data storage program that demonstrates the same functions as those in the first embodiment, that is, as depicted in FIG. 18, a forecast detailed-data creating program 74a, a determining program 74b, and an offset detailed-data creating program 74c are stored beforehand in the ROM 74.

The CPU 75 reads and executes these programs 74a, 74b, and 74c, so that the respective programs 74a, 74b, and 74c can be achieved as a forecast detailed-data creating process 75a, a determining process 75b, and an offset detailed-data creating process 75c, as depicted in FIG. 18. The processes 75a, 75b, and 75c correspond to the forecast detailed-data creating unit 31, the determining unit 32, and the offset detailed-data creating unit 33 depicted in FIG. 2, respectively.

A detailed data table 73a and an order holding table 73b are provided in the HDD 73, as depicted in FIG. 18. The tables 73a and 73b correspond to the detailed data database 21 and the order holding unit 22 depicted in FIG. 2, respectively.

The respective programs 74a, 74b, and 74c do not need to be stored in the ROM 74, and for example, can be stored in a "portable physical medium" such as a flexible disk (FD), CD-ROM, MO disk, DVD disk, magneto-optical disk, or IC card inserted into the computer 70, a "fixed physical medium" such as a hard disk drive (HDD) provided inside or outside of the computer 70, or "another computer (or server)" connected to the computer 70 via a public line, the Internet, LAN, or WAN, so that the computer 70 reads the program therefrom and executes the program.

Figure 19:
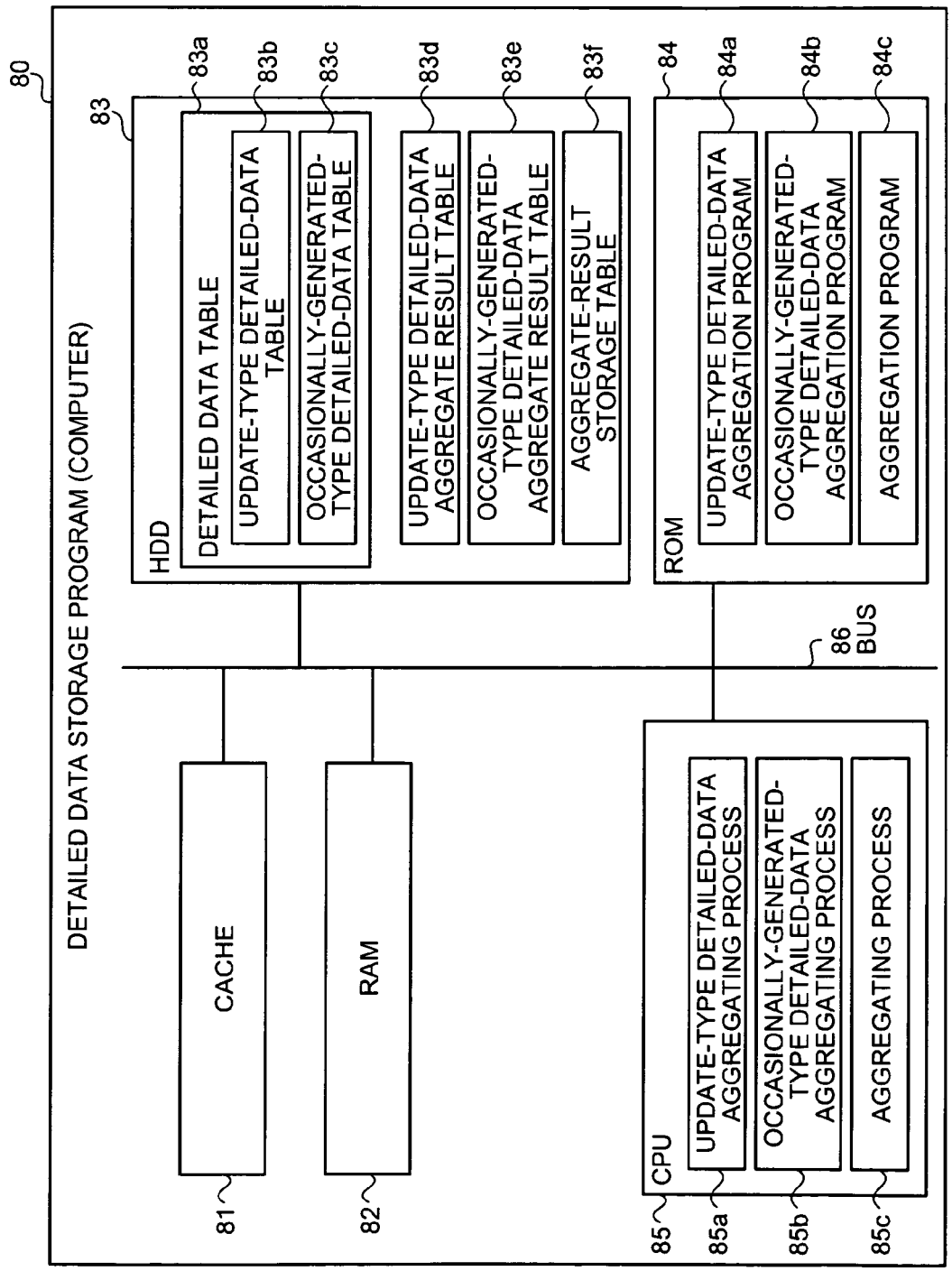
FIG. 19 depicts the computer that executes the detailed data storage program.

Various types of processes explained in the second embodiment can be realized by executing the program prepared beforehand on the computer such as the personal computer or workstation. One example of the computer that executes the detailed data storage program having the same functions as those in the second embodiment is explained with reference to FIG. 19. FIG. 19 depicts a computer that executes the detailed data storage program.

As depicted in FIG. 19, a computer 80 as the detailed data storage program is connected to a cache 81, a RAM 82, an HDD 83, a ROM 84, and a CPU 85 by a bus 86. A detailed data storage program that demonstrates the same functions as those in the second embodiment, that is, as depicted in FIG. 19, an update-type detailed-data aggregation program 84a, an occasionally-generated-type detailed-data aggregation program 84b, and an aggregation program 84c are stored beforehand in the ROM 84.

The CPU 85 reads and executes these programs 84a, 84b, and 84c, so that the respective programs 84a, 84b, and 84c can be achieved as an update-type detailed-data aggregating process 85a, an occasionally-generated-type detailed-data aggregating process 85b, and an aggregating process 85c. The processes 85a, 85b, and 85c correspond to the update-type detailed-data aggregating unit 61, the occasionally-generated-type detailed-data aggregating unit 62, and the aggregating unit 63 depicted in FIG. 8, respectively.

As depicted in FIG. 19, provided in the HDD 83 are an update-type detailed-data table 83b, an occasionally-generated-type detailed-data table 83c, an update-type detailed-data aggregate result table 83d, an occasionally-generated-type detailed-data aggregate result table 83e, and an aggregate-result storage table 83f. The tables 83b, 83c, 83d, and 83f correspond to the update-type detailed-data storage unit 51a, the occasionally-generated-type detailed-data storage unit 51b, the update-type detailed-data aggregate-result storage unit 52, the occasionally-generated-type detailed-data aggregate-result storage unit 53, and the aggregate-result storage unit 54, respectively.

The respective programs 84a, 84b, and 84c do not need to be stored in the ROM 84, and for example, can be stored in "a portable physical medium" such as a flexible disk (FD), CD-ROM, MO disk, DVD disk, magneto-optical disk, or IC card inserted into the computer 80, "a fixed physical medium" such as a hard disk drive (HDD) provided inside or outside of the computer 80, or "another computer (or server)" connected to the computer 80 via a public line, the Internet, LAN, or WAN, so that the computer reads the program therefrom and executes the program.

[System Configuration or the Like]

Among the processes explained in the embodiments, all or part of the processes explained as being automatically performed can be manually performed, or all or part of the processes explained as being manually performed (for example, input of orders held by the order holding unit or a process of selecting an update-type detailed-data aggregate result) can be automatically performed through a known method. In addition, the process procedures, control procedures, specific names, and information including various data and parameters explained in the specification and depicted in the drawings can be arbitrarily changed, unless otherwise specified.

Each component of the apparatuses depicted in the drawings (for example, FIG. 2, FIG. 8 or the like) is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various load and the state of use. Furthermore, all or arbitrary part of the processing functions performed in each component can be realized by a CPU and a program analyzed and executed on the CPU, or can be realized as hardware with a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer readable storage medium containing instructions, wherein the instructions, when executed by a computer, cause the computer to perform:
    storing, in a database, price data of an article or a service at one stage during a process, the article or the service being sold at an end of the process consisting of a plurality of stages, and the price of the article or the service being changeable at each stage;
    creating, when the database receives price data at one of the stages, forecast data indicating predicted prices at subsequent stages and storing the created forecast data in the database;
    determining, when the database receives price data at one of the plurality of stages, whether a stage immediately previous to the one of the plurality of stages exists based on an order of the stages in the process; and
    creating offset data indicating a negative value of the predicted price indicated in the forecast data for offsetting forecast data created at the stage immediately previous to the one of the multiple stages when the immediately previous stage is determined to exist at the determining, and storing the offset data in the database, wherein
    the price data is provided in different format depending on a system which provides the price data.

2. The computer readable storage medium according to claim 1, wherein
    the process consists of a plurality of stages, the stages include four stages of "negotiation", "order acceptance", "sales", and "payment at cost" or three stages of "estimate", "order placement", and "acceptance", and the price data is a detailed statement or a slip issued at each stage.

3. A computer readable storage medium containing instructions, wherein the instructions, when executed by a computer, cause the computer to perform:
    sorting and storing update-type data which indicated budget based on update time, every time the update-type data is input, the update-type data being data which is updated at one or more predetermined update times;
    adding and storing occasionally-generated-type data which indicated performance in association with time of generation, every time the occasionally-generated-type data is input, the occasionally-generated-type data being data which is updated at any time;
    selecting a piece of the update-type data corresponding to one of the update times corresponding to a predetermined time and stored at the sorting and storing and performing aggregation with respect to the predetermined time using the selected update-type data and the occasionally-generated-type data stored at the adding and storing; and
    obtaining an aggregate result through aggregation with respect to the predetermined time and sorted by the predetermined time.

4. The computer readable storage medium according to claim 3, the instructions further cause the computer to perform:
    firstly aggregating the update-type data stored at the sorting and storing for each update time;
    secondly aggregating the occasionally-generated-type data stored at the adding and storing;
    firstly storing aggregate results of the update-type data aggregated at the firstly aggregating, sorted by the update time; and
    secondly storing an aggregate result of the occasionally-generated-type data aggregated at the secondly aggregating, wherein
    at the selecting, one of the aggregate results of the update-type data relating to a predetermined time and stored at the firstly storing is selected, and aggregation with respect to the predetermined time is performed using the selected aggregate result of the update-type data and the aggregate result of the occasionally-generated-type data stored at the secondly storing.

5. A data storage apparatus comprising:
    a microprocessor coupled to a memory,
    wherein the microprocessor is programmed to aggregate data by:
    storing, in a database, price data of an article or a service at one stage during a process, the article or the service being sold at an end of the process consisting of a plurality of stages, and the price of the article or the service being changeable at each stage;
    creating, when the database receives price data at one of the stages, forecast data indicating predicted prices subsequent stages and storing the created forecast data in the database;
    determining, when the database receives price data one of the plurality of stages, whether a stage immediately previous to the one of the plurality of stages exists based on an order of the stages in the process; and
    creating offset data indicating a negative value of the predicted price indicated in the forecast data for offsetting forecast data created at the stage immediately previous to the one of the multiple stages when the immediately previous stage is determined to exist at the determining, and storing the offset data in the database, wherein
    the price data is provided in different format depending on a system which provides the price data.

6. The data storage apparatus according to claim 5 wherein the process consists of a plurality of stages, the stages include four stages of "negotiation", "order acceptance", "sales", and "payment at cost" or three stages of "estimate", "order placement", and "acceptance", and the price data is a detailed statement or a slip issued at each stage.

7. A data storage apparatus comprising:

a microprocessor coupled to a memory, wherein the microprocessor is programmed to aggregate data by:

sorting and storing update-type data which indicates budget based on update time, every time the update-type data is input, the update-type data being data which is updated at one or more predetermined update times;

adding and storing occasionally-generated-type data which indicates performance in association with time of generation, every time the occasionally-generated-type data is input, the occasionally-generated-type data being data which is updated at any time;

selecting a piece of the update-type data corresponding to one of the update times corresponding to a predetermined time and stored at the sorting and storing and performing aggregation with respect to the predetermined time using the selected update-type data and the occasionally-generated-type data stored at the adding and storing; and obtaining an aggregate result through aggregation with respect to the predetermined time and sorted by the predetermined time.

8. The data storage apparatus according to claim 7, wherein the microprocessor is programmed to aggregate data further by:

firstly aggregating the update-type data stored at the sorting and storing for each update time;

secondly aggregating the occasionally-generated-type data stored at the adding and storing;

firstly storing aggregate results of the update-type data aggregated at the firstly aggregating, sorted by the update time; and secondly storing an aggregate result of the occasionally-generated-type data aggregated at the secondly aggregating, wherein at the selecting, one of the aggregate results of the update-type data relating to a predetermined time and stored at the firstly storing is selected, and aggregation with respect to the predetermined time is performed using the selected aggregate result of the update-type data and the aggregate result of the occasionally-generated-type data stored at the secondly storing.

9. A data storage method comprising:

storing, in a database, price data of an article or a service at one stage during a process, the article or the service being sold at an end of the process consisting of a plurality of stages, and the price of the article or the service being changeable at each stage;

creating when the database receives price data at one of the stages, forecast data indicating predicted prices at subsequent stages and storing the created forecast data in the database;

determining, when the database receives price data at one of the plurality of stages, whether a stage immediately previous to the one of the plurality of stages exists based on an order of the stages in the process; and creating, using a microprocessor, offset data indicating a negative value of the predicted price indicated in the forecast data for offsetting forecast data created at the stage immediately previous to the one of the multiple stages when the immediately previous stage is determined to exist at the determining and storing the offset data in the database, wherein the price data is provided in different format depending on a system which provides the price data.

10. The data storage method according to claim 9, wherein the process consists of a plurality of stages, the stages include four stages of "negotiation", "order acceptance", "sales", and "payment at cost" or three stages of "estimate", "order placement", and "acceptance", and the price data is a detailed statement or a slip issued at each stage.

11. A data storage method comprising:

storing data relating to each stage of a process executed through multiple stages in a database;

sorting and storing update-type data which indicates budget based on update time, every time the update-type data is input, the update-type data being data which is updated at one or more predetermined update times;

adding and storing occasionally-generated-type data which indicates performance in association with time of generation, every time the occasionally-generated-type data is input, the occasionally-generated-type data being data which is updated at any time;

selecting, using a microprocessor, a piece of the update-type data corresponding to one of the update times corresponding to a predetermined time and stored at the sorting and storing and performing, using the microprocessor, aggregation with respect to the predetermined time using the selected update-type data and the occasionally-generated-type data stored at the adding and storing; and obtaining an aggregate result through aggregation with respect to the predetermined time and sorted by the predetermined time.

12. The data storage method according to claim 11, further comprising:

firstly aggregating the update-type data stored at the sorting and storing for each update time;

secondly aggregating the occasionally-generated-type data stored at the adding and storing;

firstly storing aggregate results of the update-type data aggregated at the firstly aggregating, sorted by the update time; and secondly storing an aggregate result of the occasionally-generated-type data aggregated at the secondly aggregating, wherein at the selecting, one of the aggregate results of the update-type data relating to a predetermined time and stored at the firstly storing is selected, and aggregation with respect to the predetermined time is performed using the selected aggregate result of the update-type data and the aggregate result of the occasionally-generated-type data stored at the secondly storing.

* * * * *

UNITED STATES PATENT AND TRADEMARK OFFICE
CERTIFICATE OF CORRECTION

PATENT NO. : 8,775,370 B2
APPLICATION NO. : 12/457990
DATED : July 8, 2014
INVENTOR(S) : Yoshihiro Takagi et al.

Page 1 of 1

It is certified that error appears in the above-identified patent and that said Letters Patent is hereby corrected as shown below:

On the Title Page and in the Specification

Item [54] and Column 1, Line 1, (Title), Before "DATA" insert -- DETAILED --, therefor.

Signed and Sealed this
Eleventh Day of November, 2014

Michelle K. Lee
*Deputy Director of the United States Patent and Trademark Office*